(12) United States Patent
Kato et al.

(10) Patent No.: US 7,246,864 B2
(45) Date of Patent: Jul. 24, 2007

(54) VEHICLE MOTION CONTROL APPARATUS

(75) Inventors: Toshihisa Kato, Handa (JP); Shingo Nishigaki, Kariya (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 0 days.

(21) Appl. No.: 10/892,192

(22) Filed: Jul. 16, 2004

(65) Prior Publication Data

US 2005/0012391 A1    Jan. 20, 2005

(30) Foreign Application Priority Data

Jul. 17, 2003  (JP)  .............................. 2003-275789
Jul. 17, 2003  (JP)  .............................. 2003-275794

(51) Int. Cl.
*B60T 8/24* (2006.01)
*B60T 8/34* (2006.01)

(52) U.S. Cl. ................ 303/146; 303/113.1; 303/113.5; 701/72

(58) Field of Classification Search ................ 303/146, 303/147, 113.1, 113.2, 113.5, 9.62, 165; 701/72, 701/75, 70
See application file for complete search history.

(56) References Cited

U.S. PATENT DOCUMENTS

| | | | |
|---|---|---|---|
| 4,898,431 A | | 2/1990 | Karnopp et al. |
| 5,627,756 A | * | 5/1997 | Fukada et al. ................. 701/70 |
| 5,717,591 A | * | 2/1998 | Okada et al. ................. 701/72 |
| 5,857,754 A | * | 1/1999 | Fukami et al. ............... 303/146 |
| 6,074,018 A | | 6/2000 | Zeiner et al. |
| 6,142,581 A | | 11/2000 | Yamaguchi et al. |
| 6,547,343 B1 | | 4/2003 | Hac |
| 2005/0004738 A1 | | 1/2005 | Gronau et al. |

FOREIGN PATENT DOCUMENTS

| | | |
|---|---|---|
| DE | 101 50 493 A1 | 5/2002 |
| DE | 101 30 663 A1 | 1/2003 |
| JP | 9-240455 | 9/1997 |
| JP | 10-24821 | 1/1998 |
| JP | 10-211873 | 8/1998 |
| JP | 11-301435 | 11/1999 |
| JP | 2000-503279 | 3/2000 |
| JP | 3058172 | 4/2000 |
| JP | 2001-47999 | 2/2001 |

* cited by examiner

*Primary Examiner*—Thomas Williams
(74) *Attorney, Agent, or Firm*—Buchanan Ingersoll & Rooney PC

(57) ABSTRACT

A hydraulic pressure regulating device is disposed between a master cylinder and a pair of wheel cylinders included in each of a dual hydraulic circuit. A desired value is provided for a wheel cylinder operatively associated with a wheel to be controlled, on the basis of state variable monitored by a monitor. The desired value for at least one wheel cylinder in a hydraulic circuit including the wheel cylinder for the wheel to be controlled, is modified at least in response to operation of a brake pedal to provide a modified desired value. When the brake pedal is operated, the regulating device is controlled in response to a result of comparison between the modified desired value and the state variable, to regulate the pressure in at least one wheel cylinder included in the hydraulic circuit.

17 Claims, 10 Drawing Sheets

VEHICLE MOTION CONTROL APPARATUS

This application claims priority under 35 U.S.C. Sec.119 to No. 2003-275789 and No. 2003-275794 both filed in Japan on Jul. 17, 2003, the entire contents of which are herein incorporated by reference.

BACKGROUND OF THE INVENTION

1. Field of the Invention

The present invention relates to a vehicle motion control apparatus, particularly relates to the vehicle motion control apparatus for regulating a hydraulic braking pressure supplied to one wheel brake cylinder out of a pair of wheel brake cylinders included in a hydraulic circuit, to restrain an excessive oversteer and/or an excessive understeer, thereby to maintain stability of a vehicle in motion.

2. Description of the Related Arts

As for a vehicle motion control apparatus, there is disclosed in Japanese Patent No. 3058172, which corresponds to the U.S. Pat. No. 4,898,431, for example, an apparatus for controlling vehicle motion, by determining a desired yaw rate of a vehicle, and controlling braking force in response to a comparison of the desired yaw rate with a sensed actual yaw rate of the vehicle to maintain a vehicle stability during the vehicle motion.

In Japanese Patent Laid-open publication No. 10-211873, a vehicle posture control apparatus has been proposed, so as to enable a vehicle driver to depress a brake pedal even when a vehicle posture control is being performed, and enable the posture control to be performed by his own braking operation. In this publication, it is described that the apparatus is provided with two circuits of brake conduits for communicating a master cylinder with a pair of brake cylinders out of four brake cylinders, respectively, a pair of cut-off valves for shutting off the communication between the master cylinder and the brake conduit of each circuit to be capable of being opened or closed, and a hydraulic pressure source provided for supplying brake pressure individually to the two circuits of brake conduits. As for means for controlling the vehicle posture, there are disclosed a main control section for regulating the brake pressure supplied from the pressure source into each brake cylinder, with the pair of cut-off valves placed in their closed positions to shut off the communication between the master cylinder and all of the brake cylinders, and an opening motion control section for controlling one of the cut-off valves to be changed over to an open state, when braking operation by the vehicle driver is detected by braking operation detection means.

Also, in Japanese Patent (PCT) Laid-open publication No. 2000-503279, which corresponds to the U.S. Pat. No. 6,074,018, there is disclosed a motor vehicle braking system with traction control and/or movement dynamics regulating device, as explained hereinafter. That is, to enable building up brake pressure rapidly, one additional pump is provided in each brake circuit, whose intake side is connected directly to a master cylinder, and between an intake side of the additional pump and the master cylinder, there are no hydraulic components that would act as throttles and thereby delay the brake pressure buildup. Then, with respect to an improvement of the intake side of the additional pump and its effect, it is described that the invention has the advantage of a rapid brake pressure buildup when the master cylinder is not actuated. Furthermore, it is described (with reference numerals omitted herein) that a switchover valve is embodied as a controllable differential pressure valve, that is, a pressure difference between the wheel brake cylinder side and the master cylinder side can be established, with the pressure higher on the wheel brake cylinder side. In the exemplary embodiment shown, the switchover valve is a differential pressure proportional magnet valve. Then, it is described that if a tendency to locking or slipping occurs at one of the vehicle wheels, or if the electronic control unit by means of its gyroscope finds that the vehicle is threatening to skid, then the pump motor is turned on, and that an individual-wheel brake pressure regulation is effected in a manner known per se using the return pump, brake pressure buildup valves, and brake pressure reduction valves.

In Japanese Patent Laid-open publication No. 11-301435, there is disclosed a linear pressure difference valve for use in a brake-by-wire system, similar to the valve as shown in FIG. 1 of the publication No. 2000-503279. Then, it is described (with reference numerals omitted herein) that the linear pressure difference valves allow the flow of brake fluid between a reservoir and each wheel cylinder, almost without flow resistance, at a communication position through each valve member. A valve state with the valve member placed in a pressure difference position is controlled by electric current fed to each solenoid, to control an amount of the valve member lifted from a valve seat. In the pressure difference position, the state of the valve member can be controlled from a position for completely shutting off a conduit to a throttle position, in response to the lifted amount. In the case where the lifted amount corresponds to an approximately intermediate position from the valve seat, the throttle position has been provided for the conduit, thereby to restrict the brake fluid from flowing from the wheel cylinder to the reservoir. As a result, the brake pressure in the wheel cylinder (wheel cylinder pressure) can be held with the pressure difference against the reservoir. And, there is disclosed in Japanese Patent Laid-open publication No. 9-240455, which corresponds to the U.S. Pat. No. 6,142,581, a reservoir having a function for shutting off an intake passage for a hydraulic pressure pump when introducing brake fluid, as indicated by "200" in FIG. 6 of the Japanese publication No. 9-240455.

In order to improve a decelerating response of a vehicle, when a vehicle driver makes a braking operation while a vehicle motion control is being performed, a vehicle motion control apparatus has been proposed in Japanese Patent Laid-open publication No. 10-24821, wherein braking force applied to each wheel of the vehicle is detected by wheel braking force detection means, and wherein motion control means prohibits a wheel to be controlled from being controlled thereby, when the braking force applied to a wheel not to be controlled by the motion control means exceeds the braking force applied to the wheel to be controlled, while the vehicle motion control is being performed. And, the motion control means includes turning control means for applying the braking force to a first wheel out of all the wheels, so as to modify a vehicle moment for forcing the vehicle to be in a stable state, and deceleration control means for applying the braking force to a second wheel out of all the wheels, except for the first wheel, so as to reduce the vehicle speed.

As for the wheel braking force detection means, in Japanese Patent Laid-open publication No. 10-24821, for example, employed is wheel deceleration detection means for calculating a deceleration of each wheel on the basis of a wheel speed detected by a wheel speed sensor. Therefore, it is described that such an expensive sensor as a master cylinder pressure sensor, or wheel cylinder pressure sensor is not required. More practically, the deceleration control is prohibited, when a brake switch (stop switch) has been turned on for a period longer than a predetermined time, and when acceleration of the wheel not to be controlled is smaller than acceleration of the wheel whose deceleration is to be controlled. Furthermore, in Japanese Patent Laid-open publication No. 2001-47999, disclosed is a vehicle behavior detection apparatus for estimating at least one of braking force and side force on the basis of a slip rate and slip angle, without using an expensive sensor such as the master cylinder pressure sensor.

According to the apparatuses as disclosed in the above publication Nos. 10-211873 and 2000-503279, however, it is required that the hydraulic pressure discharged from the hydraulic pressure pump is regulated by controlling the brake pressure buildup valves and brake pressure reduction valves, with the communication with the master cylinder being shut off, when the control for maintaining a stability of the vehicle in motion (i.e., vehicle stability control) is performed. Therefore, required is a master cylinder pressure sensor as disclosed in the above publication No. 10-211873 for detecting the master cylinder pressure discharged in response to braking operation of the vehicle driver while the vehicle stability control is being performed. And, presumably, the apparatus as disclosed in the above publication No. 2000-503279 will also require a hydraulic pressure sensor similar to the sensor as described above. However, the pressure sensor for detecting the master cylinder pressure is very expensive, so that if it is not required to detect the operation of the brake pedal during the vehicle stability control, and if the hydraulic pressure sensor can be omitted, a great cost down can be achieved.

Supposing that the linear pressure difference valve as disclosed in the above publication No. 11-301435, or known linear solenoid valves are employed, and that switching valves for use in the vehicle stability control are controlled in a different manner from the prior control manner, the vehicle stability control may be performed smoothly, without the expensive master cylinder pressure sensor provided in the apparatus. In this connection, it is described in the above publication No. 10-24821 that without using any expensive sensors such as master cylinder pressure sensor or wheel cylinder pressure sensor, motion control means can prohibit the wheel to be controlled from being controlled, when the braking force applied to the wheel not to be controlled exceeds the braking force applied to the wheel to be controlled. However, this relates to the deceleration control on the basis of the comparison between the braking force applied to the wheel to be controlled and the braking force applied to the wheel not to be controlled, without directly using the brake pressure increased in response to operation of the brake pedal. In addition, as a large number of solenoid valves are required for the apparatus as disclosed in the above publication No. 10-24821, it is difficult to provide a simple and inexpensive apparatus capable of applying the braking force to the wheel not to be controlled, when the brake pedal is depressed during the vehicle stability control, with the number of solenoid valves reduced. Furthermore, while the apparatus for estimating a vehicle behavior without using the master cylinder pressure sensor is disclosed in the above publication No. 2001-47999, nothing is described about a relationship of the braking force applied to each wheel, when the brake pedal is depressed during the vehicle stability control.

SUMMARY OF THE INVENTION

Accordingly, it is an object of the present invention to provide an inexpensive vehicle motion control apparatus for performing a vehicle stability control appropriately, with a simple structure, without a master cylinder pressure sensor or the like being required, and capable of applying appropriate braking force to each wheel, when a brake pedal is depressed during the vehicle stability control.

In accomplishing the above and other objects, the vehicle motion control apparatus includes wheel brake cylinders operatively associated with wheels of a vehicle, respectively, and a master cylinder which is connected to the wheel brake cylinders through a dual hydraulic circuit with a pair of wheel brake cylinders included in each hydraulic circuit, and which discharges a hydraulic braking pressure into each hydraulic circuit in response to operation of a brake pedal. Between the master cylinder and the pair of wheel brake cylinders, a hydraulic pressure regulating device is provided for regulating the hydraulic braking pressure supplied into each of the pair of wheel brake cylinders. A vehicle state monitor is provided for monitoring state variable of the vehicle. A desired value setting unit is provided for setting a desired value provided for a wheel brake cylinder operatively associated with a wheel to be controlled, out of the pair of wheel brake cylinders included in each hydraulic circuit, to set the desired value on the basis of the state variable monitored by the vehicle state monitor. A desired value modifying unit is provided for modifying the desired value set by the desired value setting unit to provide a modified desired value for at least one wheel brake cylinder out of the pair of wheel brake cylinders including the wheel brake cylinder operatively associated with the wheel to be controlled, at least in response to operation of the brake pedal. And, a control unit is provided for controlling the pressure regulating device in response to a result of comparison between the desired value set by the desired value setting unit and the state variable monitored by the vehicle state monitor, to regulate the hydraulic braking pressure in the wheel brake cylinder operatively associated with the wheel to be controlled, and controlling the pressure regulating device in response to a result of comparison between the modified desired value provided by the desired value modifying unit and the state variable monitored by the vehicle state monitor, when the brake pedal is operated, to regulate the hydraulic braking pressure in at least one wheel brake cylinder included in the hydraulic circuit including the wheel brake cylinder operatively associated with the wheel to be controlled.

In the apparatus as described above, the one wheel brake cylinder for which the modified desired value is provided by the desired value modifying unit, may correspond to the wheel brake cylinder operatively associated with the wheel to be controlled, and the desired value modifying unit modifies the desired value at least in response to operation of the brake pedal, to terminate the control of the pressure regulating device earlier than the control performed before the brake pedal is depressed. And, the control unit controls the pressure regulating device in response to the result of comparison between the desired value set by the desired value setting unit and the state variable monitored by the vehicle state monitor, to regulate the hydraulic braking pressure in the wheel brake cylinder operatively associated with the wheel to be controlled, and the control unit controls the pressure regulating device in response to the result of comparison between the modified desired value provided by the desired value modifying unit and the state variable monitored by the vehicle state monitor, when the brake pedal is operated, to regulate the hydraulic braking pressure in the wheel brake cylinder operatively associated with the wheel to be controlled.

Preferably, the desired value modifying unit modifies the desired value, to terminate the control of the pressure regulating device earlier than the control performed when the brake pedal is operated, in the case where an anti-skid control is performed by the control unit for at least one of the wheel brake cylinders except the wheel brake cylinder operatively associated with the wheel to be controlled.

In the vehicle motion control apparatus as described above, the one wheel brake cylinder for which the modified desired value is provided by the desired value modifying unit, may correspond to the other wheel brake cylinder included in the hydraulic circuit including the wheel brake cylinder operatively associated with the wheel to be controlled, and the desired value modifying unit modifies the desired value at least in response to operation of the brake pedal, to provide a reference value for the other wheel brake cylinder. And, the control unit controls the pressure regulating device in response to the result of comparison between the desired value set by the desired value setting unit and the state variable monitored by the vehicle state monitor, to regulate the hydraulic braking pressure in the wheel brake cylinder operatively associated with the wheel to be controlled, and the control unit controls the pressure regulating device in response to the result of comparison between the modified desired value provided by the desired value modifying unit and the state variable monitored by the vehicle state monitor, when the brake pedal is operated, to regulate the hydraulic braking pressure in the other wheel brake cylinder included in the hydraulic circuit including the wheel brake cylinder operatively associated with the wheel to be controlled.

Preferably, the desired value modifying unit modifies the reference value for the other wheel brake cylinder, in the case where an anti-skid control is performed by the control unit for at least one of the wheel brake cylinders except the wheel brake cylinder operatively associated with the wheel to be controlled.

In the apparatuses as described above, the vehicle state monitor may include a yaw rate detection device for detecting an actual yaw rate of the vehicle, and the control unit may include a desired yaw rate setting unit for setting a desired yaw rate served as the desired value, a first yaw rate deviation calculation unit for calculating a deviation between the desired yaw rate set by the desired yaw rate setting unit and the actual yaw rate detected by the yaw rate detection device, a desired yaw rate modifying unit for modifying the desired yaw rate set by the first desired yaw rate setting unit to provide a modified desired yaw rate, at least in response to operation of the brake pedal, and a second yaw rate deviation calculation unit for calculating a deviation between the modified desired yaw rate provided by the desired yaw rate modifying unit and the actual yaw rate detected by the yaw rate detection device. And, the control unit controls the pressure regulating device on the basis of results calculated by the first yaw rate deviation calculation unit and the second yaw rate deviation calculation unit, to regulate the hydraulic braking pressure in the one wheel brake cylinder operatively associated with the wheel to be controlled.

In the apparatuses as described above, the hydraulic pressure regulating device in each of the hydraulic circuits may include a normally open switching valves each of which is disposed between the master cylinder and each of the pair of wheel brake cylinders, and each of which supplies the hydraulic braking pressure discharged from the master cylinder into each of the pair of wheel brake cylinders when each of the normally open switching valves is placed in an open position thereof, and a normally closed switching valves each of which is connected to a passage between each of the normally open switching valves and each of the pair of wheel brake cylinders, and each of which reduces the hydraulic braking pressure in each of the pair of wheel brake cylinders when each of the normally closed switching valves is placed in an open position thereof. A proportional pressure difference valve device is disposed between the master cylinder and the normally open switching valves in each hydraulic circuit, to regulate a pressure difference between the hydraulic pressure at the side of the master cylinder and the hydraulic pressure at the side of the normally open switching valves to provide a desired pressure difference. And, an automatic hydraulic pressure generating device is provided for generating a hydraulic braking pressure independently of the master cylinder and irrespective of operation of the brake pedal, and supplying the hydraulic braking pressure into a passage between the valve device and the normally open switching valves in each hydraulic circuit.

The proportional pressure difference valve device may include a proportional solenoid valve which is disposed between the master cylinder and the normally open switching valves in each hydraulic circuit, to regulate the pressure difference between the hydraulic pressure at the side of the master cylinder and the hydraulic pressure at the side of the normally open switching valves to provide the desired pressure difference, and further include a relief valve which is disposed in parallel with the proportional solenoid valve for allowing the brake fluid to flow from the normally open switching valves toward the master cylinder when the hydraulic pressure at the side of the proportional solenoid valve exceeds a predetermined upper limit pressure.

Or, the proportional pressure difference valve device may include a proportional pressure difference valve which is disposed between the master cylinder and the normally open switching valves in each hydraulic circuit. In this case, the control unit may be arranged to select one of a communication position for the valve where flow of brake fluid is allowed through the valve, and a pressure difference position for the valve where flow of the brake fluid is restricted on the basis of the pressure difference between the hydraulic pressure at the side of the master cylinder and the hydraulic pressure at the side of the normally open switching valves to provide the desired pressure difference.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
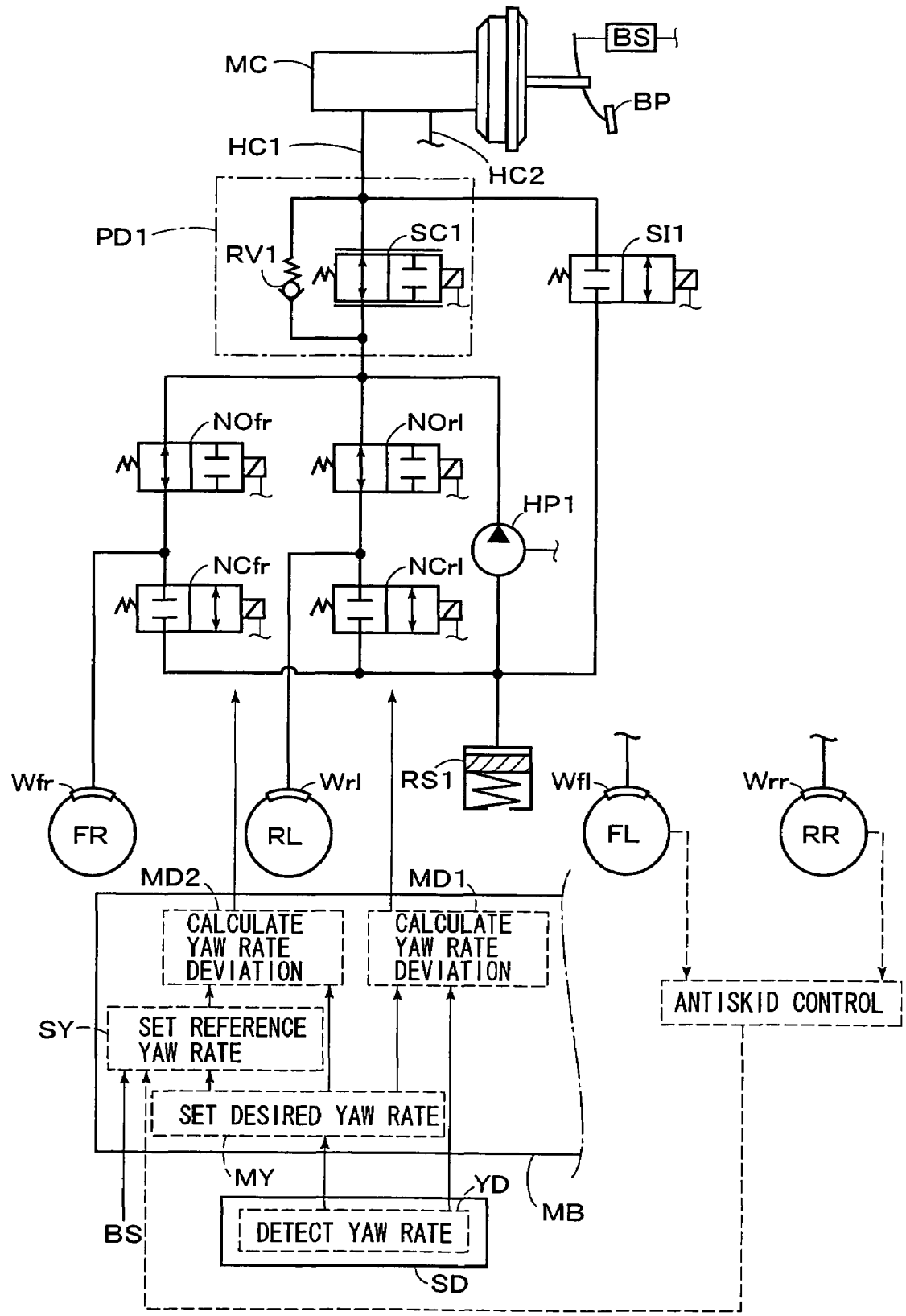
FIG. 1 is a schematic block diagram of a vehicle motion control apparatus according to an embodiment of the present invention.

Referring to FIG. 1, there is schematically illustrated a vehicle motion control apparatus according to the present invention, with a dual hydraulic circuit divided into one hydraulic circuit (HC1) and the other hydraulic circuit (HC2), the latter of which is substantially the same as the former one, and therefore omitted in FIG. 1. The hydraulic circuit (HC1) includes a pair of wheel brake cylinders Wrl and Wfr which are operatively associated with wheels RL and FR of a vehicle, respectively. A master cylinder MC is connected to the wheel brake cylinders (including Wrl and Wfr) through the dual hydraulic circuit, to discharge a hydraulic braking pressure into each hydraulic circuit in response to operation of a brake pedal BP. And, normally open solenoid operated switching valves NOrl and NOfr (hereinafter, simply referred to as normally open valves NOrl and NOfr) are each disposed between the master cylinder MC and each of the wheel brake cylinders Wrl and Wfr. When each of the normally open valves NOrl and NOfr is placed in an open position thereof, the hydraulic braking pressure discharged from the master cylinder MC is supplied into each of the wheel brake cylinders Wrl and Wfr, through a proportional solenoid valve SC1 which will be described later in detail. Also, normally closed solenoid operated switching valves NCrl and NCfr (hereinafter, simply referred to as normally closed valves NCrl and NCfr) are each connected to a passage between each of the normally open valves NOrl and NOfr and each of the wheel brake cylinders Wrl and Wfr. The normally closed valves NCrl and NCfr are connected to a reservoir RS1 that stores the brake fluid drained from the wheel brake cylinders Wrl and Wfr. When each of the normally closed valves NCrl and NCfr is placed in an open position thereof, therefore, the hydraulic braking pressure in each of the wheel brake cylinders Wrl and Wfr is reduced.

The proportional solenoid valve SC1 as mentioned above is disposed between the master cylinder MC and the normally open valves NOrl and NOfr in the hydraulic circuit (HC1). In parallel with the proportional solenoid valve SC1, a relief valve RV1 is disposed so as to allow the brake fluid to flow from the normally open valves NOrl and NOfr toward the master cylinder MC when the hydraulic pressure at the side of the proportional solenoid valve SC1 exceeds a predetermined upper limit pressure. The proportional solenoid valve SC1 and relief valve RV1 serve as a proportional pressure difference valve device PD1, wherein the proportional solenoid valve SC1 is actuated to regulate a pressure difference between the hydraulic pressure at the side of the master cylinder MC and the hydraulic pressure at the side of the normally open valves NOrl and NOfr to be of a desired value, within the predetermined upper limit pressure provided by the relief valve RV1.

Furthermore, there is provided a hydraulic pressure pump HP, which serves as an automatic hydraulic pressure generating device of the present invention, and which generates a hydraulic braking pressure independently of the master cylinder MC and irrespective of operation of the brake pedal BP, to supply the hydraulic braking pressure into a passage between the proportional solenoid valve SC1 and the normally open valves NOrl and NOfr. According to the present embodiment, an inlet of the hydraulic pressure pump HP1 is connected to the reservoir RS1, and connected to the master cylinder MC through an inlet valve SI1, which is formed by a normally closed solenoid operated switching valve.

According to the present embodiment, a vehicle state monitor SD is provided for monitoring state variable of the vehicle, and includes a yaw rate detection device YD for detecting an actual yaw rate of the vehicle, which is fed to a control unit MB. The control unit MB of the present embodiment includes a desired yaw rate setting unit MY for setting a desired yaw rate of the vehicle, and a first yaw rate deviation calculation unit MD1, which calculates a deviation between the desired yaw rate set by the desired yaw rate setting unit MY and the actual yaw rate detected by the yaw rate detection device YD. According to the control unit MB, therefore, the hydraulic pressure pump HP1 and the proportional solenoid valve SC1 are controlled on the basis of the state variable monitored by the vehicle state monitor SD, e.g., the calculated result of the first yaw rate deviation calculation unit MD1, and the hydraulic braking pressure in one of wheel brake cylinders in each hydraulic circuit (e.g., the wheel brake cylinder Wrl operatively associated with a wheel RL to be controlled for the vehicle stability control). In addition, there are provided a desired yaw rate modifying unit SY for modifying the desired yaw rate to provide a modified desired yaw rate, which is served as the modified value, to terminate the control earlier, in response to operation of the brake pedal BP, and a second yaw rate deviation calculation unit MD2, which calculates a deviation between the modified desired yaw rate and the actual yaw rate detected by the yaw rate detection device YD. When the brake pedal BP is depressed, the hydraulic braking pressure in the wheel brake cylinder Wrl (operatively associated with the wheel RL to be controlled) is regulated on the basis of the result calculated by the second yaw rate deviation calculation unit MD2.

Figure 6:
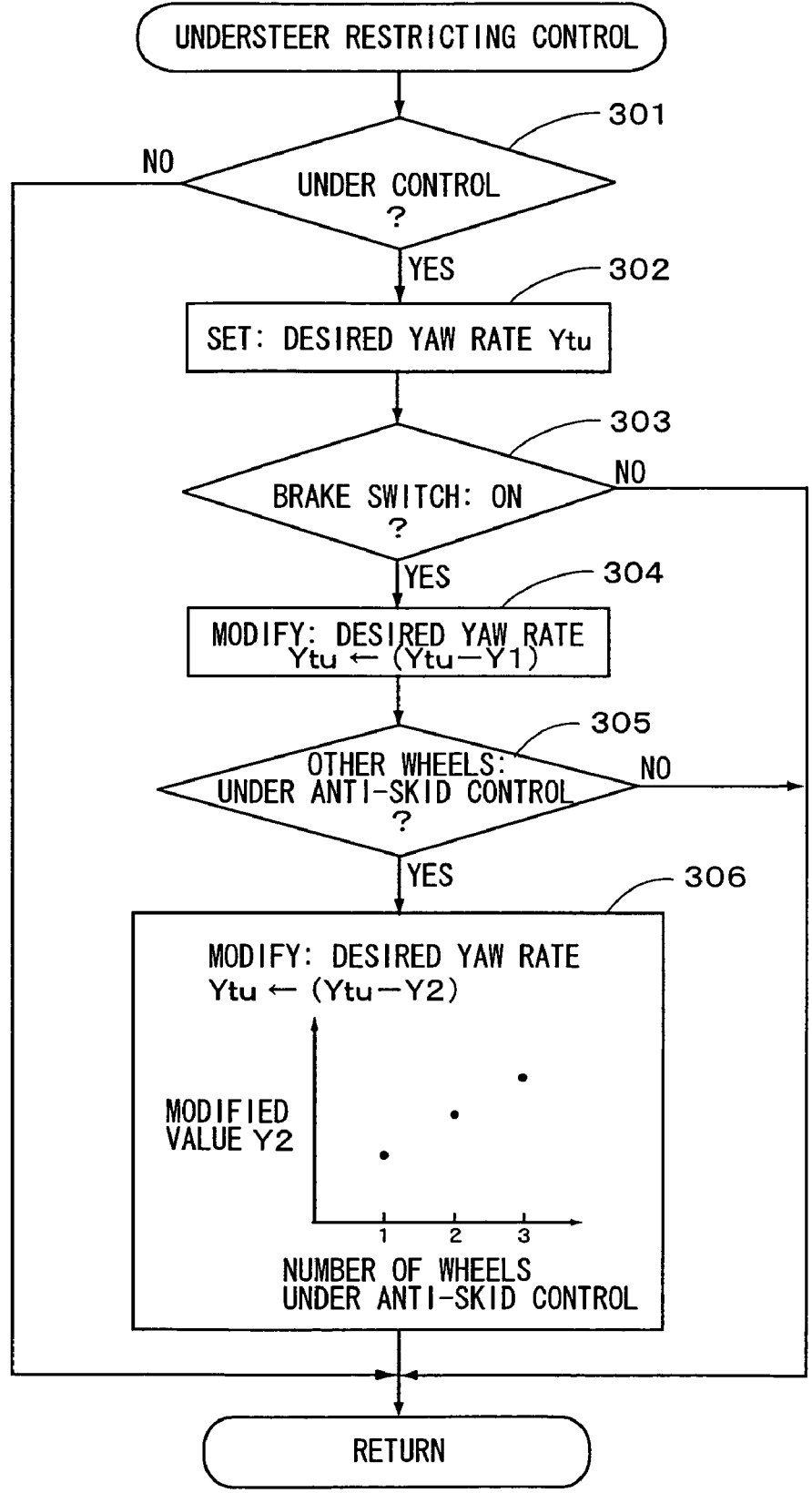
FIG. 6 is a flowchart showing a subroutine of understeer restraining control, according to an embodiment of the present invention.

According to the control unit MB, therefore, on the basis of the result of the vehicle state monitor SD, the hydraulic pressure pump HP1 is controlled, and the normally open valve NOfr, which is connected to the wheel brake cylinder Wfr, is placed in its closed position. In this state, on the basis of the result calculated by the first yaw rate deviation calculation unit MD1, the proportional solenoid valve SC1 is controlled, and the normally open valve NOrl and normally closed valve NCrl, which are connected to the wheel brake cylinder Wrl, are controlled, thereby to maintain the vehicle stability. During this control, if the brake pedal BP is depressed, the normally open valve NOrl and normally closed valve NCrl (connected to the wheel brake cylinder Wrl) are controlled on the basis of the result calculated by the second yaw rate deviation calculation unit MD2, as will be described later with reference to FIGS. 6 and 7.

Figure 2:
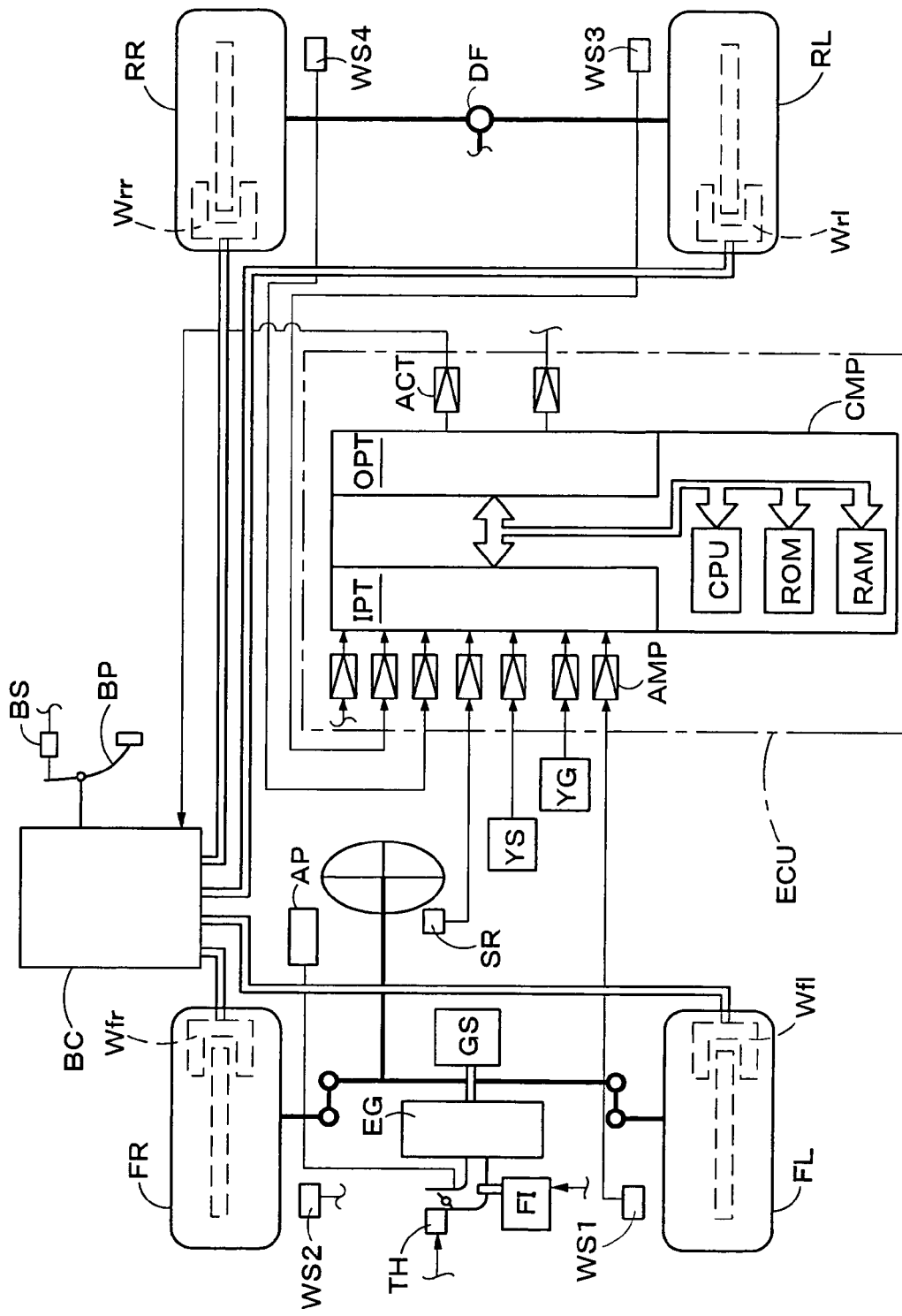
FIG. 2 is a schematic block diagram of a vehicle including a vehicle motion control apparatus according to an embodiment of the present invention.
Figure 3:
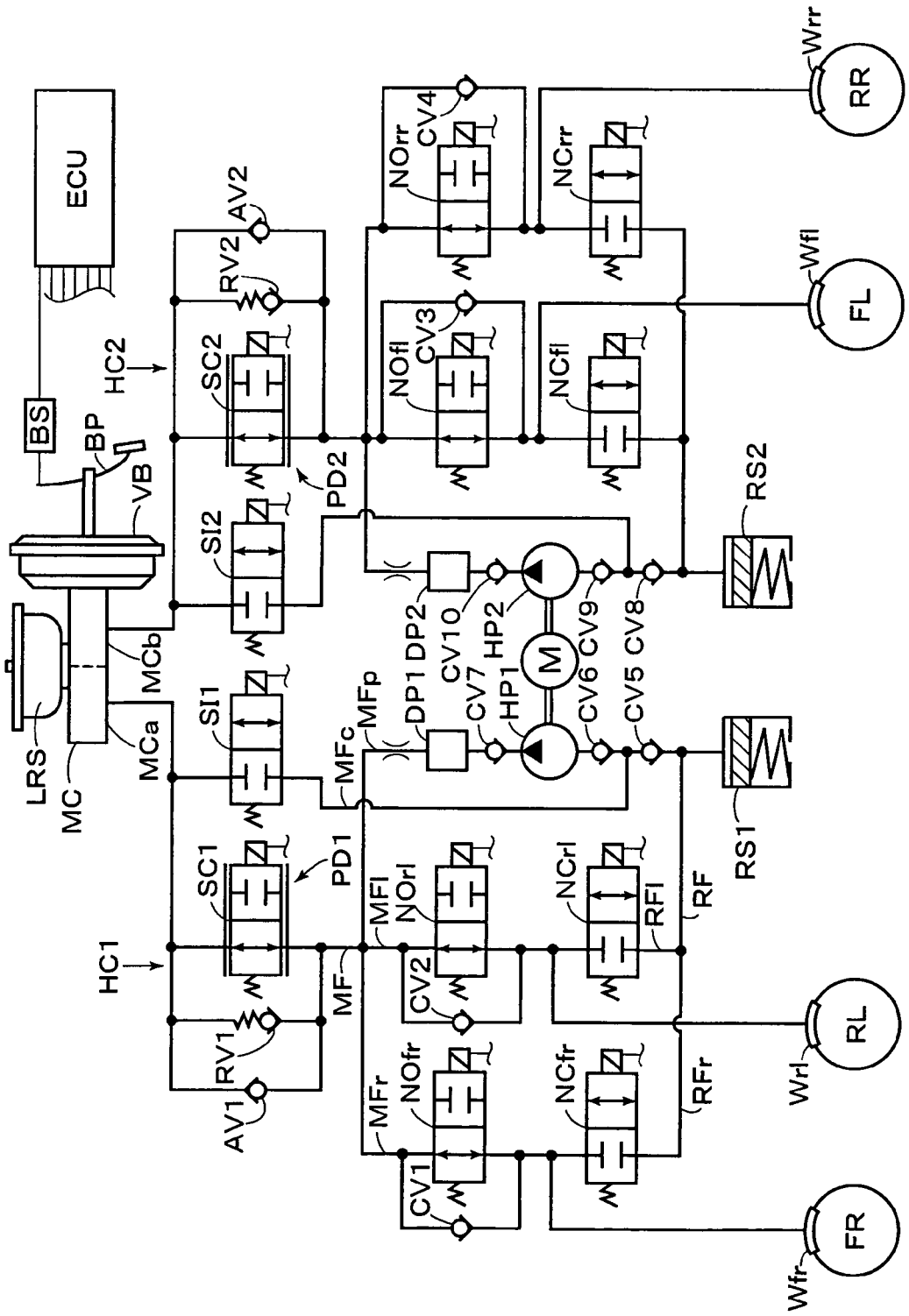
FIG. 3 is a block diagram illustrating a hydraulic brake system according to an embodiment of the present invention.

FIG. 2 shows a vehicle including the embodiment as shown in FIG. 1 and a hydraulic brake system as constituted in FIG. 3. In FIG. 2, the vehicle has an engine EG provided with a fuel injection apparatus FI and a throttle control apparatus TH which is adapted to control a throttle opening in response to operation of an accelerator pedal AP. Also, the throttle opening of the throttle control apparatus TH is controlled and the fuel injection apparatus FI is actuated to control the fuel injected into the engine EG, in response to output of the electronic control unit ECU, which serves as the control unit MB in FIG. 1. In FIG. 2, a wheel FL designates the wheel at the front left side as viewed from the position of a driver's seat, a wheel FR designates the wheel at the front right side, a wheel RL designates the wheel at the rear left side, and a wheel RR designates the wheel at the rear right side. These wheels are operatively associated with wheel brake cylinders Wfl, Wfr, Wrl and Wrr, respectively. According to the present embodiment, the engine EG is operatively connected with the rear wheels RL and RR through a transmission GS and a differential gear apparatus DF, which is controlled in response to output of the electronic control unit ECU, so that a shift-down can be made automatically to provide a so-called engine-brake for reducing a vehicle speed. Thus, a so-called rear drive system is constituted in FIG. 2, while the drive system is not limited to the rear-drive system, but the present invention is applicable to a front drive system or a four-wheel drive system.

In the vicinity of the wheels FL, FR, RL and RR, there are provided wheel speed sensors WS1–WS4, respectively, which are connected to the electronic control unit ECU, and by which a signal having pulses proportional to a rotational speed of each wheel, i.e., a wheel speed signal is fed to the electronic control unit ECU. There are also provided a brake switch BS which turns on when the brake pedal BP is depressed, and turns off when the brake pedal BP is released, a steering angle sensor SR for detecting a steering angle of the vehicle, a yaw rate sensor YS for detecting a yaw rate of the vehicle, a lateral acceleration sensor YG for detecting a vehicle lateral acceleration, a throttle sensor (not shown) and the like. These are electrically connected to the electronic control unit ECU to control the engine EG and/or a hydraulic brake control apparatus BC, the latter of which will be explained later in detail with reference to FIG. 3.

As shown in FIG. 2, the electronic control unit ECU is provided with a microcomputer CMP which includes a central processing unit or CPU, a read-only memory or ROM, a random access memory or RAM, an input port IPT, an output port OPT and the like. The signals detected by the wheel speed sensors WS1–WS4, yaw rate sensor YS, lateral acceleration sensor YG, steering angle sensor SR, brake switch BS and the like are fed to the input port IPT via respective amplification circuits AMP and then to the central processing unit CPU. Then, control signals are fed from the output port OPT to the throttle control apparatus TH and hydraulic brake control apparatus BC via the respective driving circuits ACT. In the microcomputer CMP, the memory ROM memorizes a program corresponding to flowcharts as shown in FIGS. 4–6 and 8, the central processing unit CPU executes the program while the ignition switch (not shown) is closed, and the memory RAM temporarily memorizes variable data required to execute the program. In the electronic control unit ECU, therefore, the control unit MB as shown in FIG. 1 is constituted to operate as will be described later.

Next, referring to FIG. 3, will be explained the hydraulic brake system including the hydraulic brake control apparatus BC as described above. According to the present embodiment, a master cylinder MC is activated though a vacuum booster VB in response to depression of the brake pedal BP to pressurize the brake fluid in a low-pressure reservoir LRS and discharge the master cylinder pressure to the hydraulic circuits for the wheels FR and RL, and the wheels FL and RR, respectively. The master cylinder MC is of a tandem type having two pressure chambers communicated with the first and second hydraulic circuits HC1 and HC2, respectively. That is, a first pressure chamber MCa is communicated with a first hydraulic circuit HC1 for the wheels FR and RL, and a second pressure chamber MCb is communicated with a second hydraulic circuit HC2 for the wheels FL and RR. Thus, according to the present embodiment, the hydraulic circuit system is divided into two hydraulic circuits (HC1 and HC2) to form a diagonal circuit (so called X-circuit) system, while a front-rear dual circuit system may be formed.

In the first hydraulic circuit HC1 for the wheels FR and RL, the first pressure chamber MCa is communicated with wheel brake cylinders Wfr and Wrl, respectively, through a main hydraulic passage MF and its branch hydraulic passages MFr and MFl. In the main passage MF, there is disposed a normally open solenoid operated linear proportional valve SC1. Also, the first pressure chamber MCa is connected through an auxiliary hydraulic passage MFc to a passage between the check valves CV5 and CV6, which will be described later. In the auxiliary passage MFc, there is disposed a normally closed solenoid operated inlet valve SI1. In parallel with the proportional valve SC1, there are disposed a relief valve RV1 which prevents the brake fluid in the master cylinder MC from flowing to a downstream direction (toward the wheel brake cylinders Wfr and Wrl), and allows the brake fluid to flow toward the master cylinder MC when the braking pressure at the downstream side is more than the braking pressure at the master cylinder MC by a predetermined pressure difference, and a check valve AV1 which allows the flow of the brake fluid to the downstream direction (toward the wheel brake cylinders Wfr and Wrl), and prevents its reverse flow. The relief valve RV1 is provided for returning the brake fluid to the low-pressure reservoir LRS through the master cylinder MC when the pressurized braking pressure discharged from the hydraulic pressure pump HP1 is more than the braking pressure discharged from the master cylinder MC by the predetermined pressure difference, thereby to regulate the braking pressure discharged from the hydraulic pressure pump HP1 not to exceed a predetermined upper limit pressure. According to the present embodiment, therefore, the proportional pressure difference valve device PD1 is constituted by the relief valve RV1 and the proportional valve SC1. The proportional valve SC1 is controlled by the electronic control unit ECU, so that the pressure difference between the hydraulic pressure at the side of the master cylinder MC and the hydraulic pressure at the side of normally open two-port two position solenoid operated switching valves NOfr and NOrl is regulated to be of a desired value, within a range less than the predetermined upper limit pressure provided by the relief valve RV1. Because of the check valve AV1, even if the proportional valve SC1 is in its closed position, when the brake pedal BP is depressed, the hydraulic braking pressure in the wheel brake cylinders Wfr and Wrl can be increased.

The normally open two-port two position solenoid operated switching valves NOfr and NOrl (hereinafter, simply referred to as normally open valves NOfr and NOrl), are disposed in the branch passages MFr and MFl, respectively, and in parallel therewith check valves CV1 and CV2 are disposed, respectively. The check valves CV1 and CV2 are provided for allowing the flow of the brake fluid toward the master cylinder MC and preventing the flow of the brake fluid toward the wheel brake cylinders Wfr and Wrl. The brake fluid in the wheel brake cylinders Wfr and Wrl is returned to the master cylinder MC, and then to the low-pressure reservoir LRS through the check valves CV1 and CV2, and the proportional valve SC1 placed in its first position as shown in FIG. 1. Accordingly, if the brake pedal BP is released, the hydraulic braking pressure in each of the wheel brake cylinders Wfr and Wrl is rapidly reduced to the pressure lower than the pressure at the master cylinder MC. And, normally closed two-port two position solenoid operated switching valves NCfr and NCrl (hereinafter, simply referred to as normally closed valves NCfr and NCrl) are disposed in the branch passages RFr and RFl, respectively, which merge into the drain passage RF connected to the reservoir RS1.

In the first hydraulic circuit HC1 for the wheels FR and RL, a hydraulic pressure pump HP1 is disposed in a passage MFp connected to the branch passages MFr and MFl at the upstream of the normally open valves NOfr and NOrl. The hydraulic pressure pump HP1 is connected to the reservoir RS1 at its inlet side through check valves CV5 and CV6, and connected at its outlet side to the normally open valves NOfr and NOrl through a check valve CV7 and a damper DP1. The hydraulic pressure pump HP1 is driven by a single electric motor M together with a hydraulic pressure pump HP2 to introduce the brake fluid from the inlet, pressurize the brake fluid to a predetermined pressure, and discharge it from the outlet. The reservoir RS1 is disposed independently of the low-pressure reservoir LRS of the master cylinder MC, and provided with a piston and a spring to function as an accumulator for storing a necessary volume of the brake fluid for various controls.

The master cylinder MC is connected to a passage between the check valves CV5 and CV6 disposed at the inlet side of the hydraulic pressure pump HP1 through the auxiliary passage MFc. The check valve CV5 is provided for preventing the flow of the brake fluid toward the reservoir RS1 and allowing the reverse flow. The check valves CV6 and CV7 are provided for restricting the flow of the brake fluid discharged from the hydraulic pressure pump HP1 in a predetermined direction, and generally formed within the hydraulic pressure pump HP1 in a body. Accordingly, the inlet valve SI1 is normally placed in its closed position as shown in FIG. 3, where the communication between the master cylinder MC and the inlet of the hydraulic pressure pump HP1 is blocked, and switched to its open position, where the master cylinder MC is communicated with the inlet of the hydraulic pressure pump HP1.

In the second hydraulic circuit HC2 for the wheels FL and RR, there are disposed a reservoir RS2 and a proportional solenoid valve SC2 which constitute the proportional pressure difference valve device PD2, damper DP2, normally closed two-port two-position solenoid operated inlet valve SI2, normally open valves NOfl and NOrr, normally closed valves NCfl and NCrr, check valves CV3, CV4 and CV8–CV10, relief valve RV2, and check valve AV2. The hydraulic pressure pump HP2 is driven by the electric motor M together with the hydraulic pressure pump HP1, both of the pumps HP1 and HP2 will be driven continuously after the motor M begins to operate them. The proportional valve SC2, inlet valve SI2 and normally open valves NOfl and NOrr, and normally closed valves NCfl and NCrr are controlled by the electronic control unit ECU to perform the vehicle stability control.

According to the hydraulic brake system as described above, every valves are placed in their normal positions as shown in FIG. 3, and the motor M is stopped, during the normal braking operation. When the brake pedal BP is depressed in the state as shown in FIG. 3, the master cylinder MC is actuated to discharge the master cylinder pressure from the first and second pressure chambers MCa and MCb to the first hydraulic circuit HC1 for the wheels FR and RL, and the second hydraulic circuit HC2 for the wheels FL and RR, respectively, and supply the hydraulic braking pressure into the wheel brake cylinders Wfr, Wrl, Wfl and Wrr, through the proportional valves SC1 and SC2, and the normally open valves NOfr, NOrl, NOfl and NOrr placed in their open positions. During the braking operation, when the wheel RL tends to be locked for example, and the anti-skid control begins, the normally open valve NOfr for the other wheel FR is placed in its closed position to hold the hydraulic braking pressure therein. In the pressure decreasing mode, the normally open valve NOrl is placed in its closed position, and the normally closed valve NCrl is placed in its open position. As a result, the wheel brake cylinder Wrl is communicated with the reservoir RS1 through the normally closed valve NCrl, so that the brake fluid in the wheel brake cylinder Wrl is drained into the reservoir RS1 to reduce the hydraulic braking pressure in the wheel brake cylinder Wrl.

When a pulse-increase pressure mode is selected for the wheel brake cylinder Wrl, the normally closed valve NCrl is placed in its closed position and then the normally open valve NOrl is placed in its open position, so that the master cylinder pressure is supplied from the master cylinder MC to the wheel brake cylinder Wrl through the proportional valve SC1 and the normally open valve NOrl in their open positions. Then, the normally open valve NOrl is opened and closed alternately, so that the hydraulic braking pressure in the wheel brake cylinder Wrl is increased and held repeatedly like pulses thereby to be increased gradually. When a rapid increase pressure mode is selected for the wheel brake cylinder Wrl, the normally closed valve NCrl is placed in its closed position, and then the normally open valve NOrl is placed in its open position, so that the master cylinder pressure is supplied from the master cylinder MC to the wheel brake cylinder Wrl. When the brake pedal BP is released and the master cylinder pressure comes to be lower than the pressure in the wheel brake cylinder Wrl, the brake fluid in the wheel brake cylinder Wrl is returned to the master cylinder MC through the check valve CV2 and the proportional valve SC1 placed in its open position, and consequently to the low pressure reservoir LRS. Thus, an independent braking force control is performed with respect to each wheel.

According to the vehicle stability control, however, the proportional valve is actuated in accordance with the vehicle state to regulate the hydraulic pressure in the wheel brake cylinder for the wheel to be controlled (abbreviated to controlled wheel), in the normal state where the normally open valves are placed in their open positions and the normally closed valves are placed in their closed positions, without the aforementioned pressure decreasing control being made by placing the normally closed valve in its open position so as to reduce the hydraulic pressure in the wheel brake cylinder operatively associated with the controlled wheel. In the case where the wheel brake cylinder Wrl is to be controlled for the vehicle stability control, for example, the normally open valve NOfr provided for the wheel brake cylinder Wfr operatively associated with the wheel FR which is not to be controlled in the same hydraulic circuit, is placed in its closed position, whereas the proportional valve SC1 is actuated in accordance with the state variable of the vehicle to regulate the hydraulic pressure in the wheel brake cylinder Wrl to provide a desired pressure, with the normally open valve NOrl placed in its open position and the normally closed valve NCrl placed in its closed position (i.e., in their normal positions as shown in FIG. 3).

Figure 4:
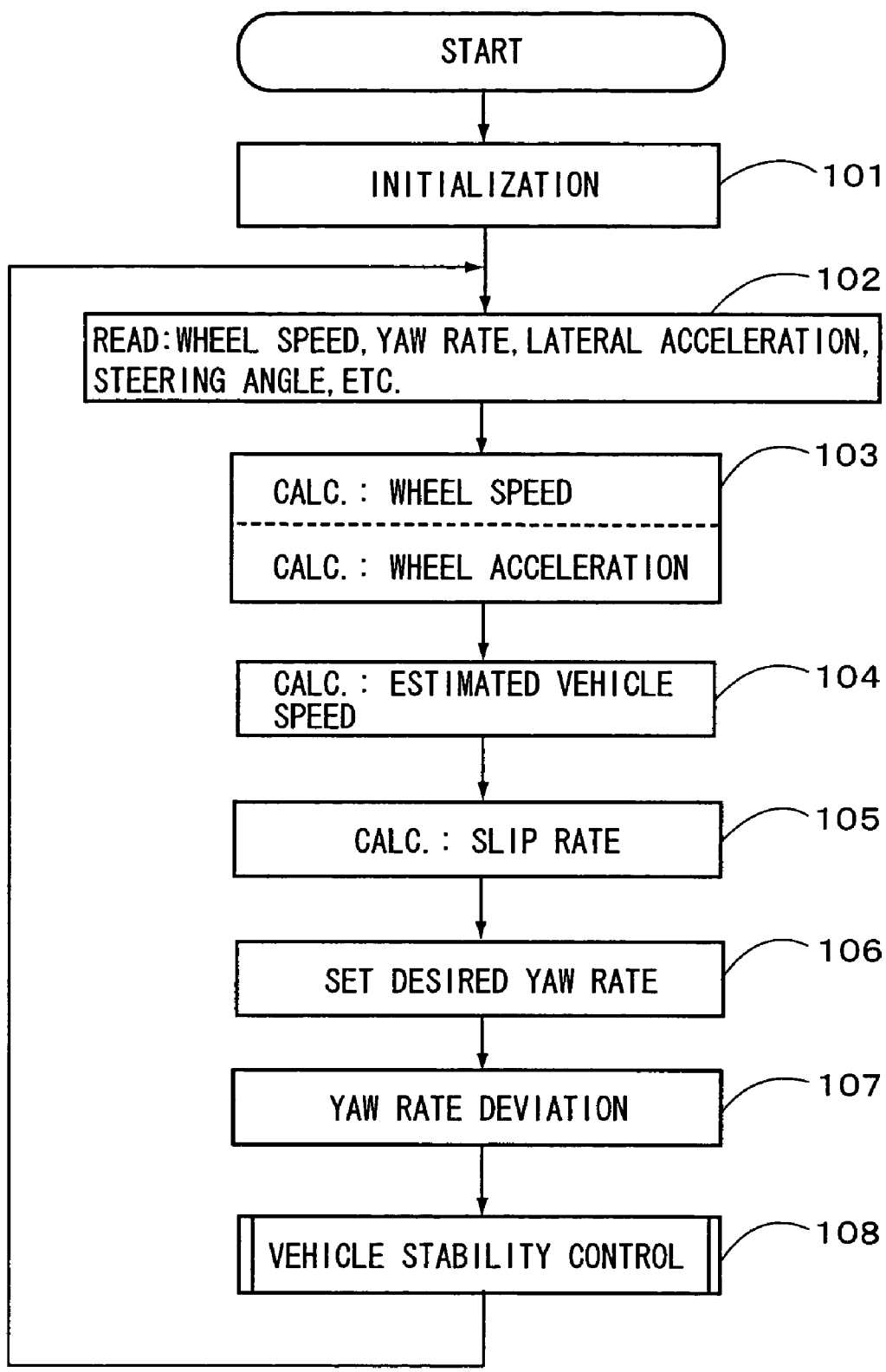
FIG. 4 is a flowchart showing a main routine of a vehicle motion control according to an embodiment of the present invention.

According to the present embodiment as constituted above, a program routine for the vehicle stability control is executed by the electronic control unit ECU, as will be described hereinafter with reference to FIG. 4. The program routine starts when an ignition switch (not shown) is turned on. At the outset, the program provides for initialization of the system at Step 101 to clear various data, and proceeds to Steps 102–108, which are repeated at a predetermined time period. At Step 102, read by the electronic control unit ECU are the signals indicative of the vehicle state such as wheel speed Vw, yaw rate Ya, lateral acceleration Gy, steering angle As and the like, which are detected by the wheel speed sensors WS1–WS4, yaw rate sensor YS, lateral acceleration sensor YG, steering angle sensor SR, brake switch BS and the like. Those signals are filtered, and stored in the memory. Then, the program proceeds to Step 103 where a reference wheel speed Vr of each wheel is calculated on the basis of the wheel speeds (Vw) output from the wheel speed sensors WS1–WS4, and it is differentiated to provide a wheel acceleration of each wheel. According to the present embodiment, the detected wheel speeds are converted into a speed on the gravity center of the vehicle, on the basis of which the reference wheel speed Vr is calculated for each wheel. Then, an estimated vehicle speed Vs is calculated at Step 104, and an actual slip rate Sa (=(Vs−Vr)/Vs), or wheel slip, is calculated at Step 105. The details of those calculations made at Steps 103–105 are described in detail in the Japanese Patent Laid-open publication No. 10-24821.

Next, at Step 106, on the basis of the state variable of the vehicle as described above, a desired yaw rate is calculated. In this embodiment, a desired yaw rate Yto for the oversteer restraining control and a desired yaw rate Ytu for the understeer restraining control are provided as follows:

At the outset, the desired yaw rate Yto is calculated on the basis of the lateral acceleration Gy and estimated vehicle speed V as described above, as [Yto=Gy/V]. Then, the desired yaw rate Ytu is calculated on the basis of the lateral acceleration Gy, steering angle As, estimated vehicle speed V and etc, as follows;

$$Ytu=Gy/V+C[(V\cdot As)/\{N\cdot L\cdot(1+K\cdot V^2)\}-Gy/V],$$

where "N" indicates a steering gear ratio, "L" indicates a wheelbase, "K" indicates a stability factor, and "C" indicates a weighted factor.

Figure 5:
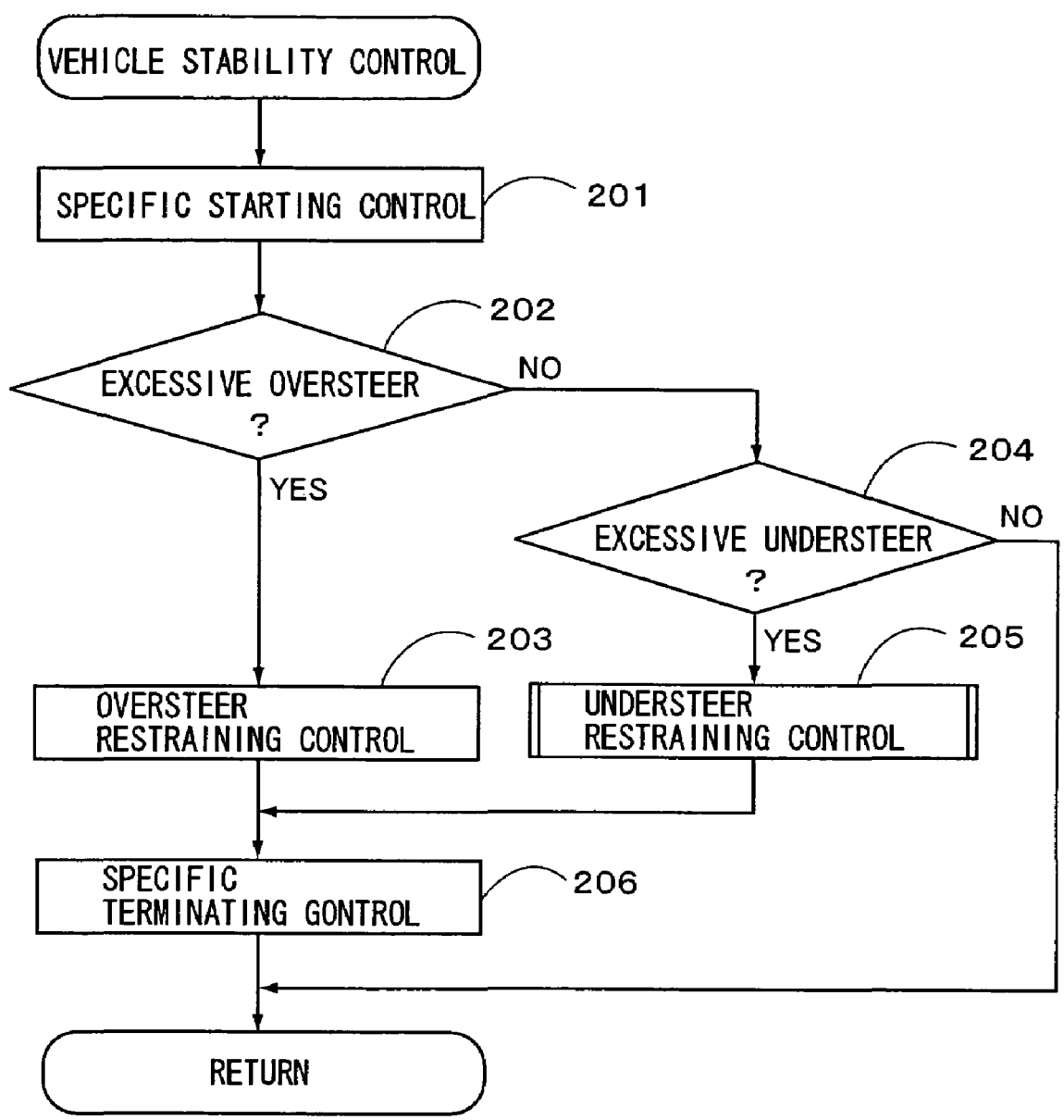
FIG. 5 is a flowchart showing a subroutine of a vehicle stability control according to an embodiment of the present invention.

Then, calculated at Step 107 are a yaw rate deviation ΔYto (=Yto−Ya) between the actual yaw rate Ya detected by the yaw rate sensor YS and the desired yaw rate Yto, or a yaw rate deviation ΔYtu (=Ytu−Ya) between the actual yaw rate Ya and the desired yaw rate Ytu, on the basis of which the vehicle stability control is performed at Step 108, i.e., the control for restraining the excessive oversteer and/or the excessive understeer, as will be described later in detail with reference to FIG. 5. When the yaw rate deviation ΔYto is of negative value, it is determined that the vehicle is under the oversteer state, and otherwise it is under the understeer state.

Next, referring to FIG. 5, will be explained operation of the vehicle stability control. After a specific starting control is performed at Step 201 if necessary, the program proceeds to Step 202 where an absolute value of the deviation ΔYto is compared with a reference value K0. If it is determined that the absolute value of the yaw rate deviation (hereinafter, referred to as deviation) ΔYto is equal to or greater than the reference value Ko, it is determined that the vehicle is under the excessive oversteer state, the program proceeds to Step 203 where the oversteer restraining control is performed. On the contrary, if it is determined that the absolute value of the deviation ΔYto is smaller than the reference value Ko, the program proceeds to Step 204 where the deviation ΔYtu is compared with a reference value Ku. If it is determined that the deviation ΔYtu is equal to or greater than the reference value Ku, it is determined that the vehicle is under the excessive understeer state, the program proceeds to Step 205 where the understeer restraining control is performed. According to the present embodiment, with respect to the wheels operatively associated with the wheel brake cylinders included in a single hydraulic circuit, the wheel FR (or FL) positioned at the front outside of the vehicle is determined to be a wheel not to be controlled (abbreviated to uncontrolled wheel), and the braking force is applied to the wheel RL (or RR) positioned at the rear inside of the vehicle on the diagonal line to the wheel FR (or FL), thereby to perform a so-called diagonal control system. In practice, the wheel cylinder pressure is held with respect to the wheel FR (or FL) positioned at the front outside of the vehicle, whereas the wheel cylinder pressure is regulated for the wheel brake cylinder Wrl (or Wrr) operatively associated with the wheel RL (or RR) positioned at the rear inside of the vehicle. After the control as described above is finished, a specific terminating control is performed at Step 206, and the program returns to the main routine as shown in FIG. 4.

According to the present embodiment, during the understeer restraining control performed at Step 205 for the controlled wheel, the hydraulic braking pressure (wheel cylinder pressure) is regulated with respect to the uncontrolled wheel, as well. The relationship between the controlled wheel and the uncontrolled wheel will be explained with reference to FIG. 7. The understeer restraining control executed at Step 205 will be explained hereinafter with reference to FIG. 6. At the outset, it is determined at Step 301 whether the understeer restraining control is being performed (under control), or not. If the result is affirmative, the program proceeds to Step 302 where the desired yaw rate Ytu is set. Then, the state of the brake switch BS is determined at Step 303. If the brake pedal BP has been depressed and it is determined that the brake switch BS has been turned on, the program proceeds to Step 304 where the desired yaw rate Ytu for use in the control of the controlled wheel (e.g., RL) is modified, whereas if the brake switch BS has been turned off, the program returns to the routine as shown in FIG. 5. For example, the desired yaw rate Ytu is modified at Step 304 by subtracting a predetermined value Y1 from it, to decrease the absolute value of the subtracted result, thereby to provide a modified desired yaw rate (=Ytu−Y1). In other words, the desired yaw rate Ytu is modified to result in terminating the control earlier (i.e., to finish the control earlier) than the control without that modification mode. The predetermined value Y1 may be provided so as to be increased linearly, with the slip rate of the wheel FR increased.

Then, the program proceeds to Step 305 where it is determined if the anti-skid control is being performed with respect to the uncontrolled wheels except the wheel RL to be controlled. If none of them are under the anti-skid control, the program returns to the routine as shown in FIG. 5. In the case where at least one of them is under the anti-skid control, the program proceeds to Step 306 where the desired yaw rate Ytu is modified further. According to a map as shown in Step 306 in FIG. 6, a modified value Y2 is provided on the basis of the number of wheels (1, 2 or 3) being under the anti-skid control, and the modified value Y2 is subtracted from the desired yaw rate Ytu to decrease the absolute value further, whereby the desired yaw rate Ytu is modified to terminate the control earlier (i.e., to finish the control earlier) than the control without that modification being made. In this case, the modified desired yaw rate is determined by a value (Ytu−Y1−Y2), with reference to the desired yaw rate Ytu provided when the control began. This is because it can be understood that the braking force is being required to be increased when another wheel (e.g., FL or RR) is under the anti-skid control. Therefore, the desired yaw rate Ytu is modified to terminate the control earlier (i.e., to finish the control earlier), to accelerate termination of the control, and accelerate applying the braking force thereafter.

Figure 7:
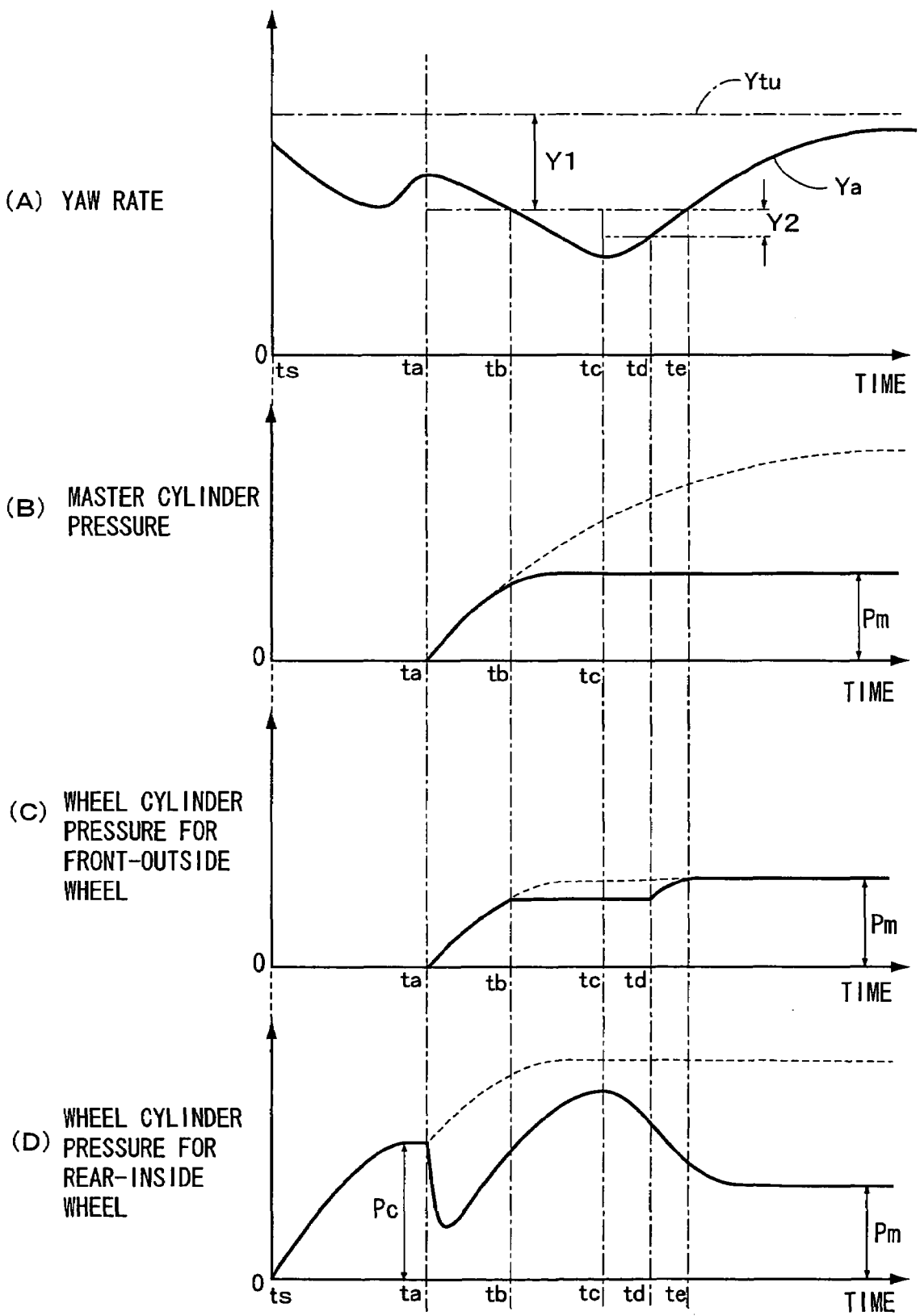
FIG. 7 is a diagram showing wheel cylinder pressure for rear inside and front outside wheels regulated, when a brake pedal is depressed, while wheel cylinder pressure for the rear inside wheel is being regulated in its understeer state, according to an embodiment of the present invention.

The understeer restraining control as described above will be explained hereinafter with reference to a time chart as shown in FIG. 7, where the actual yaw rate varies as indicated by a solid line in (A), and the rear inside wheel (e.g., wheel RL) is selected for the controlled wheel, as shown in (D). At the time "ts", the motor M begins to be driven to discharge the hydraulic pressure from the hydraulic pressure pump HP1 (HP2), so that the hydraulic pressure in the wheel brake cylinder Wrl is pressurized through the normally open valve NOrl placed in its open position, to be increased as indicated by a solid line. Whereas, the front outside wheel FR positioned on the diagonal line to the wheel RL is determined to be the uncontrolled wheel, so that the normally open valve NOfr is placed in its closed position. In this state, therefore, the hydraulic pressure in the wheel brake cylinder Wfr is held as shown in (C) of FIG. 7, so that no braking force is applied to the wheel FR, as well as the other two wheels (FL and RR) to which no braking force is applied.

With the understeer restraining control applied to the rear inside wheel RL as described above, the yaw rate begins to be recovered. When the brake pedal BP is depressed at the time "ta" for example, the master cylinder pressure is discharged, as shown in (B) of FIG. 7, wherein a solid line indicates a case where the depressed state of the brake pedal BP is held, and a broken chain line indicates another case where the brake pedal BP is depressed continuously. In this case, as the predetermined modified value Y1 is subtracted from the desired yaw rate Ytu to provide the modified desired value (Ytu−Y1), the actual yaw rate Ya exceeds the modified desired value (Ytu−Y1) as shown in (D) of FIG. 7. At least in this state, therefore, the normally open valve NOrl is placed in its closed position and the normally closed valve NCrl is placed in its open position, whereby the wheel cylinder pressure in the wheel brake cylinder Wrl for the controlled wheel is regulated to be decreased, as indicated by a solid line in (D) of FIG. 7. Whereas, a broken line in (D) indicates a property which is provided in the case where the original desired yaw rate Ytu is used, and when the wheel cylinder pressure in the wheel brake cylinder Wrl is regulated to be increased at the time of "ta", whereby the wheel cylinder pressure in the wheel brake cylinder Wrl for the controlled wheel will become the one added to the regulated pressure Pc by the master cylinder pressure Pm.

On the other hand, at the time of "tb" when the actual yaw rate Ya comes to be lower than the modified desired value (Ytu−Y1), the wheel cylinder pressure in the wheel brake cylinder Wrl is being increased as indicated by a solid line in (D) of FIG. 7. Although the hydraulic pressure is regulated at this stage on the basis of the yaw rate deviation between the actual yaw rate and the modified desired yaw rate, the yaw rate deviation has been set to be approximately zero in FIG. 7, so as to be explained easily. Supposing that the modified desired yaw rate (Ytu−Y1) is continuously used after the time "tb", the control will be terminated around the time "te". According to the present embodiment, however, if the anti-skid control for controlling another wheel (e.g., FL or RR) begins at the time "tc" in FIG. 7, the further modified desired yaw rate (Ytu−Y1−Y2) is used, so that the control will be terminated around the time "td". With respect to the wheel brake cylinder Wfr operatively associated with the wheel FR in the same hydraulic circuit as the wheel brake cylinder Wrl for the controlled wheel, the normally open valve NOfr is changed from its closed position to its open position at the time "ta", the master cylinder pressure is supplied to the wheel brake cylinder Wfr, as indicated by a solid line in (C) of FIG. 7, and the normally open valve NOfr is placed in its closed position at the time "tb" to hold the hydraulic braking pressure in the wheel brake cylinder Wfr. Then, at the time "td" when the actual yaw rate Ya exceeds the modified desired yaw rate (Ytu−Y1−Y2), the normally open valve NOfr is placed in its open position to supply the master cylinder pressure Pm. As a result, the termination of the control for the wheel RL is accelerated, thereby to accelerate applying the braking force to other wheels by the master cylinder pressure. The master cylinder pressure is supplied to the wheel brake cylinders Wfl and Wrr operatively associated with the wheels FL and RR in the second hydraulic circuit HC2 as shown in FIG. 3, which are omitted in FIG. 7.

Thus, while the understeer restraining control is being performed with respect to the rear inside wheel RL to be controlled, if the brake pedal BP is depressed (at the time "ta" in FIG. 7), the braking force will be applied to all of the wheels, with the pressure regulation for the wheel RL being changed over immediately to be terminated. As a result, an appropriate deceleration can be obtained, without deteriorating the stability control. Furthermore, if the anti-skid control for controlling another wheel (e.g., FL or RR) begins, the wheel cylinder pressure in the wheel brake cylinder Wrl for the wheel RL is changed to be terminated more rapidly, to increase the braking property. Although the present embodiment as disclosed in FIGS. 6 and 7 relates to the understeer restraining control in the diagonal control system, the present embodiment (and therefore, the preset invention) may be applied to the oversteer restraining control, thereby to achieve the vehicle stability control appropriately.

Next will be explained about another embodiment of the present invention, with reference to FIGS. 8–10, with its fundamental structure formed in substantially the same manner as the embodiment as disclosed in FIGS. 1–5, which will serve as the drawings for disclosing the present embodiment, so that the vehicle state monitor SD and yaw rate detection device YD are provided. With respect to the control unit MB as shown in FIG. 1, however, it is so constituted that the hydraulic braking pressure in one wheel brake cylinder operatively associated with a wheel to be controlled, is regulated in response to the result of comparison between the desired yaw rate set by the desired yaw rate setting unit MY and the state variable monitored by the vehicle state monitor SD, and that when the brake pedal BP is operated, the hydraulic braking pressure in the other wheel brake cylinder included in a hydraulic circuit including the wheel brake cylinder operatively associated with the wheel to be controlled, in response to a result of comparison between the modified desired value provided by the desired yaw rate modifying unit SY and the state variable monitored by the vehicle state monitor SD.

The control unit MB of the present embodiment includes the desired yaw rate setting unit MY for setting the desired yaw rate of the vehicle, and the first yaw rate deviation calculation unit MD1, which calculates the deviation between the desired yaw rate set by the desired yaw rate setting unit MY and the actual yaw rate detected by the yaw rate detection device YD. The desired yaw rate modifying unit SY is provided for modifying the desired yaw rate at least in response to operation of the brake pedal BP, to provide a reference yaw rate served as the reference value, and the second yaw rate deviation calculation unit MD2 is provided for calculating a deviation between the desired yaw rate modified by the desired yaw rate modifying unit SY and the actual yaw rate detected by the yaw rate detection device YD, according to the present embodiment. The hydraulic braking pressure in the wheel brake cylinder Wrl operatively associated with the wheel RL to be controlled for the vehicle stability control, is regulated in response to the result of comparison between the desired yaw rate set by the desired yaw rate setting unit MY and the actual yaw rate detected by the yaw rate detection device YD, whereas, when the brake pedal BP is operated, the hydraulic braking pressure in the other wheel brake cylinder Wfr is regulated in response to the result of comparison between the modified desired yaw rate provided by the desired yaw rate modifying unit SY and the actual yaw rate detected by the yaw rate detection device YD.

According to the control unit MB, therefore, on the basis of the state variable monitored by the vehicle state monitor SD, the hydraulic pressure pump HP1 is controlled, and the normally open valve NOfr, which is connected to the wheel brake cylinder Wfr, is placed in its closed position. Then, the proportional solenoid valve SC1 is controlled on the basis of the calculated result of the first yaw rate deviation calculation unit MD1, so that the hydraulic braking pressure in the wheel brake cylinder Wrl is regulated appropriately to maintain the vehicle stability. During the control as described above, when the brake pedal BP is depressed, the hydraulic braking pressure in the wheel brake cylinder Wfr (operatively associated with the uncontrolled wheel FR) is regulated, with the normally open valve NOfr and the normally closed valve NCfr controlled on the basis of the result calculated by the second yaw rate deviation calculation unit MD2, thereby to apply the braking force to the wheel FR, as will be described hereinafter.

With respect to the embodiment as described above, the understeer restraining control (executed at Step 205 in FIG. 5) will be explained hereinafter with reference to FIG. 8. At the outset, it is determined at Step 401 whether the understeer restraining control is being performed (under control), or not. If the result is affirmative, the program proceeds to Step 402 where the desired yaw rate Ytu is set. Then, the state of the brake switch BS is determined at Step 403. If the brake pedal BP has been depressed and it is determined that the brake switch BS has been turned on, the program proceeds to Step 404 where it is further determined if the other wheel is under the anti-skid control. In the case where the brake switch BS has been turned off, the program proceeds from Step 403 to Step 405, where a reference value for the diagonal control system is set. That is, the desired yaw rate Ytu set at Step 402 is provided for a reference value Ysf0 for the front outside wheel (e.g., wheel FR), and a reference value Ysr is set for the rear inside wheel (e.g., wheel RL), at Step 405.

In the case where it is determined at Step 403 that the brake switch BS has been turned on, but it is determined at Step 404 that the other wheel has not been under the anti-skid control, the program proceeds to Step 406 where the reference value for the diagonal control system is set to be different from the value at Step 405. That is, the desired yaw rate Ytu is provided as it is, for a reference value Ysr for the rear inside wheel (e.g., wheel RL), whereas a reference value Ysf1, which is a result of subtracting a predetermined value Y1 from the desired yaw rate Ytu (Ysf1=Ytu−Y1), is set for the front outside wheel (e.g., wheel FR). If it is determined at Step 404 that the other wheel is under the anti-skid control, the program proceeds to Step 407 where the desired yaw rate Ytu is provided for the reference value Ysr for the rear inside wheel (e.g., wheel RL), whereas a reference value Ysf2, which is a result of subtracting the predetermined value Y1 and Y2 from the desired yaw rate Ytu (Ysf2=Ytu−Y1−Y2), is set for the front outside wheel (e.g., wheel FR). In other words, when the other wheel (FL or RR) is under the anti-skid control, it can be construed that the control for increasing the braking force has been required. In this case, therefore, the reference value is modified so as to accelerate applying the braking force to the wheel. Accordingly, as shown in the upper section of Step 408, a duty ratio for use in the hydraulic pressure regulation in the wheel brake cylinder operatively associated with the front outside wheel (e.g., wheel FR) in the understeer restraining control is provided in response to the yaw rate deviation (Ya−Ysf). Likewise, as shown in the lower section of Step 408, a duty ratio for use in the hydraulic pressure control in the wheel brake cylinder operatively associated with the rear inside wheel (e.g., wheel RL) is provided in response to the yaw rate deviation (Ysr−Ya). In this case, the subtracting order has been made opposite to each other, between the calculation of the yaw rate deviation (Ysr−Ya) for the rear inside wheel and the yaw rate deviation (Ya−Ysf) for the front outside wheel, so as to provide a result with a positive sign.

Thus, according to the diagonal control system in the understeer restraining control, the desired yaw rate Ytu is provided for the reference value Ysr for the rear inside wheel (e.g., wheel RL), and provided for the reference value Ysf for the front outside wheel (e.g., wheel FR). When the brake pedal BP is depressed to turn on the brake switch BS, however, the reference value (Ysf1) is set to be lower than the desired yaw rate Ytu, to begin the understeer restraining control early. Furthermore, when at least one of the other wheels (FL and RR) is under the anti-skid control, the reference value (Ysf2) is set to be lower than the reference value (Ysf1), so that the front outside wheel (e.g., wheel FR) is more likely to be in such a state that the understeer restraining control will begin. The reference values Ysf1 and Ysf2 correspond to the reference yaw rate.

Figure 9:
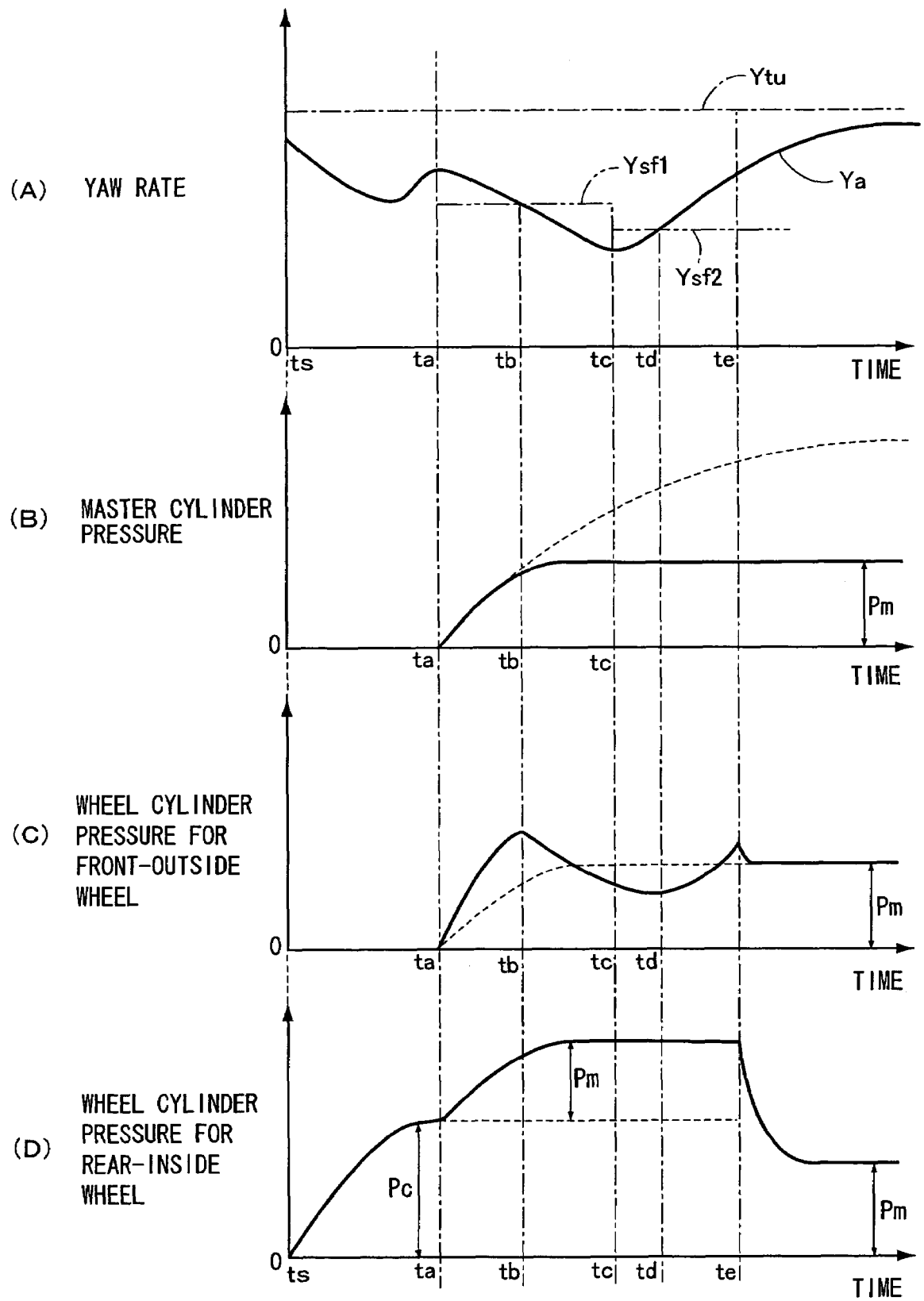
FIG. 9 is a diagram showing wheel cylinder pressure for rear inside and front outside wheels regulated, when a brake pedal is depressed, while wheel cylinder pressure for the rear inside wheel is being regulated in its understeer state, according to another embodiment of the present invention.
Figure 10:
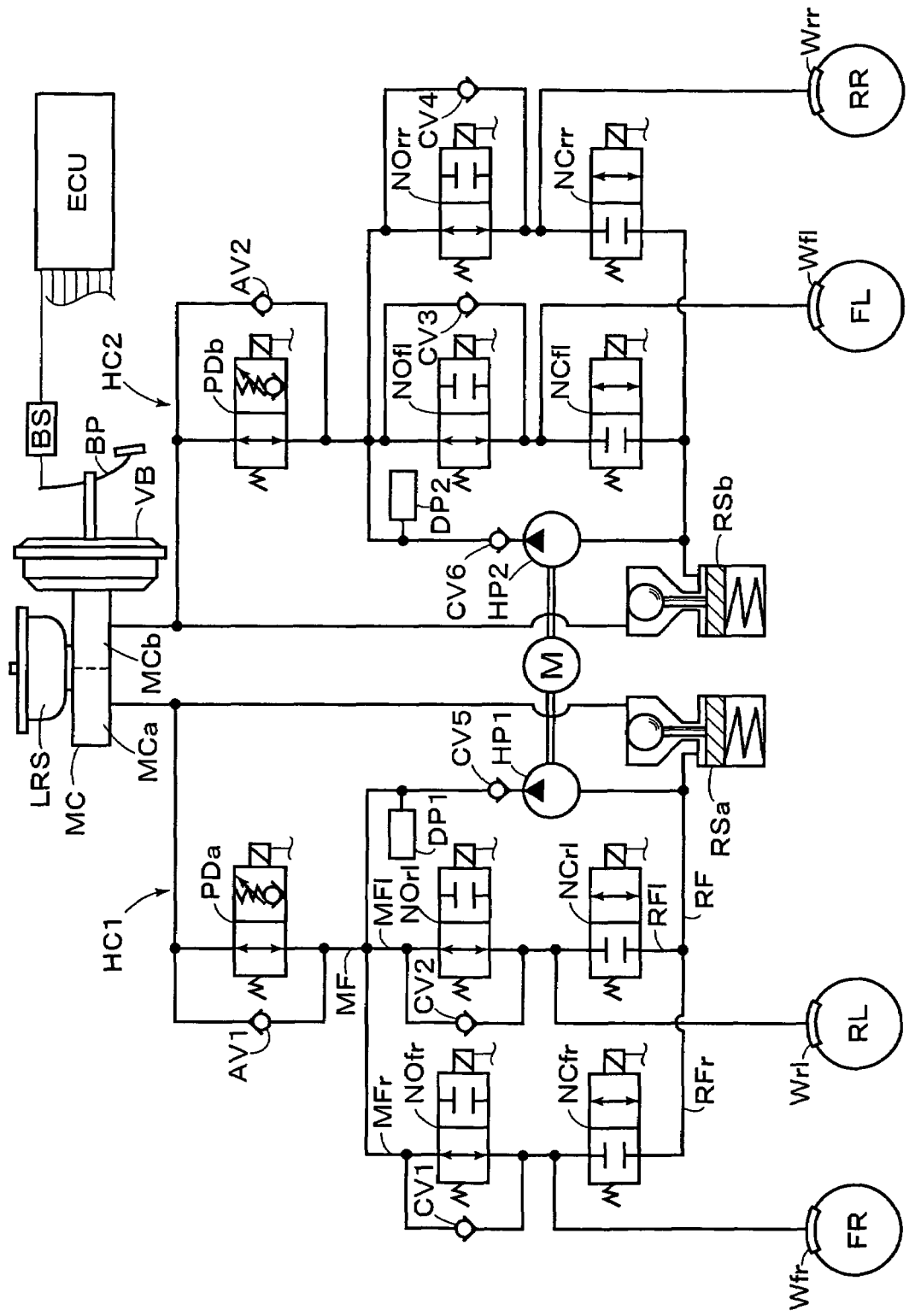
FIG. 10 is a block diagram showing a hydraulic brake system according to a further embodiment of the present invention.

The understeer restraining control as described above will be explained hereinafter with reference to a time chart as shown in FIG. 9, where the actual yaw rate varies as indicated by a solid line in (A), and the rear inside wheel (e.g., wheel RL) is selected for the controlled wheel, as shown in (D). At the time "ts", the motor M begins to be driven to discharge the hydraulic pressure from the hydraulic pressure pump HP1 (HP2), so that the hydraulic pressure in the wheel brake cylinder Wrl is pressurized through the normally open valve NOrl placed in its open position, to be increased as indicated by a solid line. Whereas, the front outside wheel FR positioned on the diagonal line to the wheel RL is determined to be the uncontrolled wheel, so that the normally open valve NOfr is placed in its closed position. Therefore, the hydraulic pressure in the wheel brake cylinder Wfr is held as shown in (C) of FIG. 9, so that no braking force is applied to the wheel FR, as well as the other two wheels (FL and RR) to which no braking force is applied.

With the understeer restraining control applied to the rear inside wheel RL as described above, the yaw rate begins to be recovered. When the brake pedal BP is depressed to turn on the brake switch BS at the time "ta" for example, the master cylinder pressure is discharged, as shown in (B) of FIG. 9, wherein a solid line indicates a case where the depressed state of the brake pedal BP is held, and a broken chain line indicates a case where the brake pedal BP is depressed continuously. As a result, the wheel cylinder pressure in the wheel brake cylinder Wrl operatively associated with the rear inside wheel RL is regulated by the proportional solenoid valve SC1, so that the wheel cylinder pressure in the wheel brake cylinder Wrl will become the one added to the regulated pressure Pc by the master cylinder pressure Pm. When the brake switch BS is turned on at the time "ta" in FIG. 9, the normally open valve NOfr is placed in its open position, so that the reference value (Ysf1) is set, as shown in Step 406 in FIG. 8. Therefore, the hydraulic braking pressure is supplied to the wheel brake cylinder Wfr operatively associated with the front outside wheel FR as shown in (C) of FIG. 9, and the regulated pressure Pc provided for the rear wheel under control is added to it, so that the increasing rate of the wheel cylinder pressure comes to be larger than the increasing rate of the master cylinder pressure (indicated by a broken line in (C) of FIG. 9). Also, the master cylinder pressure is supplied to the wheel brake cylinders Wfl and Wrr operatively associated with other wheels FL and RR included in the second hydraulic circuit HC2 as shown in FIG. 3, which are omitted in FIG. 9. During the understeer restraining control applied to the rear inside wheel RL, therefore, when the brake pedal BP is depressed (at the time "ta" in FIG. 9), the braking force is applied to all of the wheels, thereby to ensure the appropriate braking force.

Figure 8:
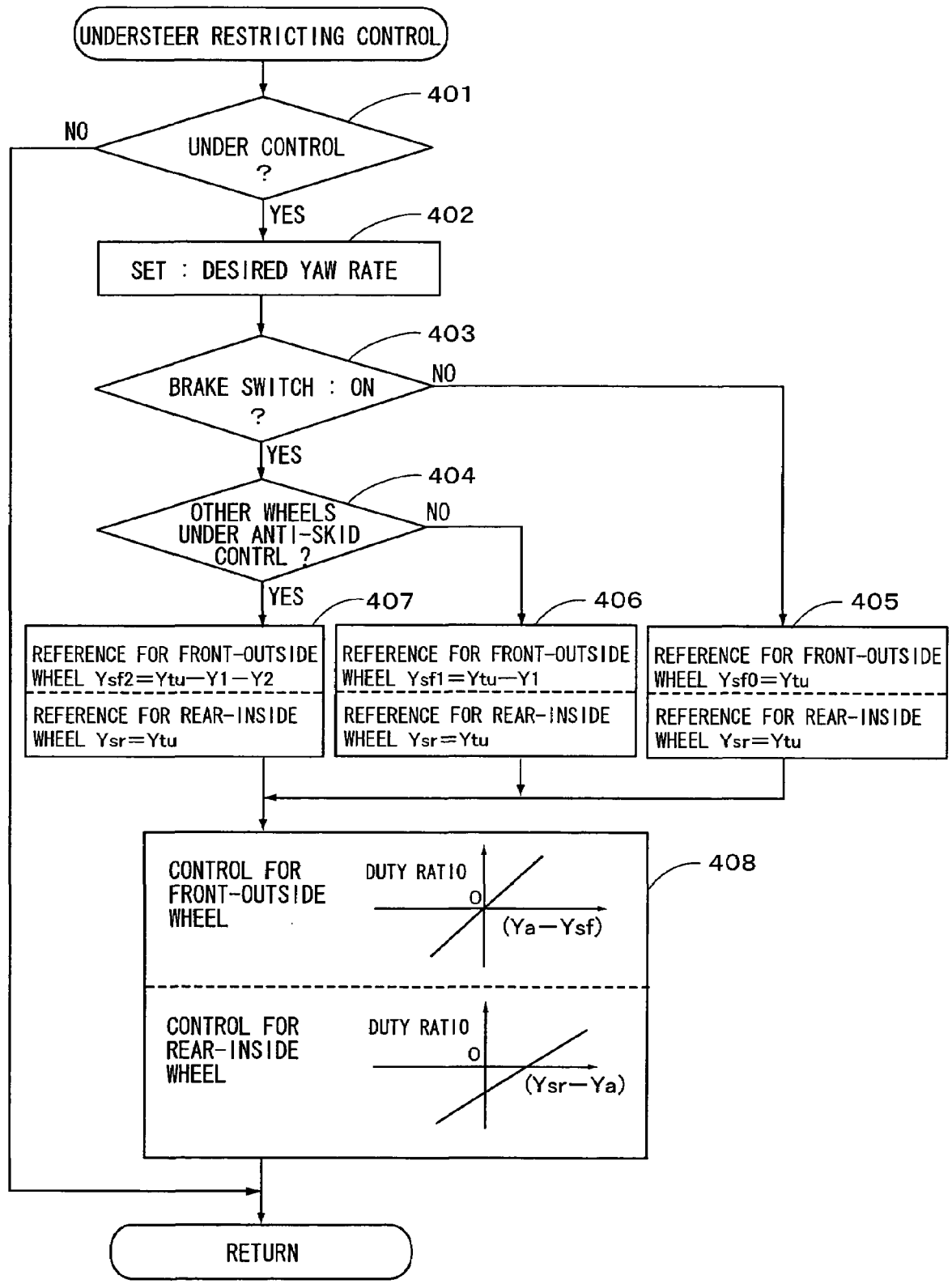
FIG. 8 is a flowchart showing a subroutine of understeer restraining control, according to another embodiment of the present invention.

As described above, when the brake switch BS is turned on at the time "ta" in FIG. 9, the reference value (Ysf1) is provided for the front outside wheel FR, as shown in Step 406 in FIG. 8, i.e., the reference value Ysf1 is set to be lower than the desired yaw rate Ytu by the predetermined modified value (Y1), whereby the front outside wheel FR (uncontrolled wheel) comes to be likely in such a state that the understeer restraining control will begin. As a result, when the actual yaw rate Ya comes to be lower than the reference value Ysf1 at the time of "tb" as shown in (A) of FIG. 9, the wheel cylinder pressure in the wheel brake cylinder Wfr operatively associated with the front outside wheel FR is regulated to be decreased, as shown in (C) of FIG. 9. When the anti-skid control begins with respect to the other two wheels (FL and RR) at the time of "tc" in FIG. 9, the reference value Ysf2 (shown in Step 407 in FIG. 8) is set to be lower than the reference value Ysf1 (=Ytu−Y1) by the predetermined value (Y2), as shown in (A) of FIG. 9, so that the front outside wheel FR (uncontrolled wheel) is more likely to be in such a state that the understeer restraining control will begin. Consequently, the hydraulic pressure control is shifted at the time of "td" in (C) of FIG. 9, into such a state that the wheel cylinder pressure in the wheel brake cylinder Wfr operatively associated with the front outside wheel FR is increased. When the pressure regulation is terminated at the time "te", the wheel cylinder pressure in the wheel brake cylinder Wrl operatively associated with the rear inside wheel RL will be decreased down to the master cylinder pressure Pm, as shown in (D) of FIG. 9.

Thus, while the understeer restraining control is being performed with respect to the rear inside wheel RL to be controlled, if the brake pedal BP is depressed (at the time "ta" in FIG. 9), the braking force will be applied to all of the wheels, thereby to ensure the appropriate braking force. At the same time, the braking force is applied to the uncontrolled wheel (front outside wheel FR) in the diagonal control system, and the desired value (desired yaw rate) for the controlled wheel (rear inside wheel RL) is modified to provide the reference value (reference yaw rate), on the basis of which the wheel cylinder pressure for the uncontrolled wheel (FR) will be regulated as well. Accordingly, when the brake pedal BP is depressed during the understeer restraining control (at the time "ta" in FIG. 9), the braking force will be applied to all of the wheels, thereby to ensure an appropriate deceleration. Also, as the understeer restraining control is performed with respect to the uncontrolled wheel, the vehicle stability control is accelerated. Furthermore, when at least one of the other wheels (FL and RR) is under the anti-skid control, the reference value is modified again, so that the understeer restraining control is further accelerated. Although the present embodiment as disclosed in FIGS. 8 and 9 relates to the understeer restraining control in the diagonal control system, the present embodiment may be applied to the oversteer restraining control, thereby to achieve the vehicle stability control appropriately.

Next, referring to FIG. 10, will be explained a further embodiment of the hydraulic brake system including the hydraulic brake control apparatus BC as shown in FIG. 2, which is provided with ten solenoid valves, i.e., smaller in number of valves by two than those required in the embodiment as shown in FIG. 3. In order to reduce the number of valves as described above, instead of the proportional pressure difference valve devices PD1 and PD2, proportional pressure difference valves PDa and PDb are employed, and instead of the inlet valves SI1 and SI2 and the reservoirs RS1 and RS2, are employed reservoirs RSa and RSb. The proportional pressure difference valves PDa and PDb are substantially the same as a valve device disclosed as a linear pressure difference valve 20 or the like in the aforementioned Japanese Publication NO. 11-301435, and the reservoirs RSa and RSb are substantially the same as a reservoir device disclosed as a reservoir 200 in the aforementioned Japanese Publication NO. 9-240455, while the control systems as a whole disclosed in those Publications are entirely different from the control system of the present embodiment.

According to the present embodiment, the proportional pressure difference valves PDa and PDb are different from a prior so-called master cylinder cut-off valve for simply cutting off the communication with the master cylinder, and they have such a function of the pressure difference valve similar to the proportional pressure difference valve devices PD1 and PD2 as shown in FIG. 3. That is, the proportional pressure difference valve PDa (or PDb) is controlled by the electronic control unit ECU to change its position between a communicating position and a pressure difference position, at the latter position of which a passage is narrowed in accordance with the pressure difference between the pressure at the side of the master cylinder MC and the pressure at the side of the normally open valves NOfr and NOrl, which act as the cut-off valves in the same manner as the embodiment as shown in FIG. 3, to provide the desired pressure difference.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control apparatus comprising:
    wheel brake cylinders operatively associated with wheels of a vehicle, respectively;
    a master cylinder connected to said wheel brake cylinders through a dual hydraulic circuit with a pair of wheel brake cylinders included in each hydraulic circuit, said master cylinder discharging a hydraulic braking pressure into each hydraulic circuit in response to operation of a brake pedal;
    hydraulic pressure regulating means disposed between said master cylinder and said pair of wheel brake cylinders, for regulating the hydraulic braking pressure supplied into each of said pair of wheel brake cylinders;
    vehicle state monitor means for monitoring state variable of said vehicle including an actual yaw rate of said vehicle;
    desired yaw rate setting means for setting a desired yaw rate provided for a wheel brake cylinder operatively associated with a wheel to be controlled, out of said pair of wheel brake cylinders included in each hydraulic circuit;
    desired yaw rate modifying means for modifying the desired yaw rate set by said desired yaw rate setting means to provide a modified desired yaw rate, which is lower than the desired yaw rate, for at least one wheel brake cylinder out of said pair of wheel brake cylinders including said wheel brake cylinder operatively associated with said wheel to be controlled, at least in response to operation of said brake pedal; and
    control means for controlling said pressure regulating means in response to a result of comparison between the desired yaw rate set by said desired yaw rate setting means and the actual yaw rate monitored by said vehicle state monitor means, to regulate the hydraulic braking pressure in said wheel brake cylinder operatively associated with said wheel to be controlled, said control means controlling said pressure regulating means in response to a result of comparison between the modified desired yaw rate provided by said desired yaw rate modifying means and the actual yaw rate monitored by said vehicle state monitor means, and said control means controlling said pressure regulating means to regulate the hydraulic braking pressure in said at least one wheel brake cylinder included in said hydraulic circuit including said wheel brake cylinder operatively associated with said wheel to be controlled when said brake pedal is operated to discharge the hydraulic braking pressure from said master cylinder while said pressure regulating means is being controlled in response to the result of the comparison between the desired yaw rate and the actual yaw rate.

2. A vehicle motion control apparatus as set forth in claim 1, wherein said one wheel brake cylinder for which the modified desired yaw rate is provided by said desired yaw rate modifying means, corresponds to said wheel brake cylinder operatively associated with said wheel to be controlled, and wherein said desired yaw rate modifying means modifies the desired yaw rate at least in response to operation of said brake pedal, to terminate the control of said pressure regulating means earlier than the control performed before said brake pedal is operated, and wherein said control means controls said pressure regulating means in response to the result of comparison between the desired yaw rate set by said desired yaw rate setting means and the actual yaw rate monitored by said vehicle state monitor means, to regulate the hydraulic braking pressure in said wheel brake cylinder operatively associated with said wheel to be controlled, and said control means controls said pressure regulating means in response to the result of comparison between the modified desired yaw rate provided by said desired yaw rate modifying means and the actual yaw rate monitored by said vehicle state monitor means, when said brake pedal is operated, to regulate the hydraulic braking pressure in said wheel brake cylinder operatively associated with said wheel to be controlled.

3. A vehicle motion control apparatus as set forth in claim 2, wherein said desired yaw rate modifying means modifies the desired yaw rate, to terminate the control of said pressure regulating means earlier than the control performed when said brake pedal is operated, in the case where an anti-skid control is performed by said control means for at least one of said wheel brake cylinders except said wheel brake cylinder operatively associated with said wheel to be controlled.

4. A vehicle motion control apparatus as set forth in claim 2, further comprising a reservoir for storing brake fluid drained from said pair of wheel brake cylinders, wherein said pressure generating means includes a hydraulic pressure pump for receiving therein the brake fluid from at least one of said reservoir and said master cylinder, and pressurizing the brake fluid in response to output from said control means, to discharge the hydraulic braking pressure.

5. A vehicle motion control apparatus as set forth in claim 2, wherein said desired yaw rate modifying means modifies the desired yaw rate by subtracting therefrom a predetermined value to provide the modified desired yaw rate.

6. A vehicle motion control apparatus as set forth in claim 2, wherein said desired yaw rate modifying means modifies the desired yaw rate in response to the number of wheels, except said wheel to be controlled, being under an anti-skid control to provide the modified desired yaw rate.

7. A vehicle motion control apparatus as set forth in claim 2, wherein said hydraulic pressure regulating means in each of said hydraulic circuits comprises; normally open switching valves each disposed between said master cylinder and each of said pair of wheel brake cylinders, each of said normally open switching valves supplying the hydraulic braking pressure discharged from said master cylinder into each of said pair of wheel brake cylinders when each of said normally open switching valves is placed in an open position thereof,
    normally closed switching valves each connected to a passage between each of said normally open switching valves and each of said pair of wheel brake cylinders, each of said normally closed switching valves reducing the hydraulic braking pressure in each of said pair of wheel brake cylinders when each of said normally closed switching valves is placed in an open position thereof,
    proportional pressure difference valve means disposed between said master cylinder and said normally open switching valves in each hydraulic circuit, said proportional pressure difference valve means regulating a pressure difference between the hydraulic pressure at the side of said master cylinder and the hydraulic pressure at the side of said normally open switching valves to provide a desired pressure difference, and automatic hydraulic pressure generating means for generating a hydraulic braking pressure independently of said master cylinder and irrespective of operation of said brake pedal, and supplying the hydraulic braking pressure into a passage between said proportional pressure difference valve means and said normally open switching valves in each hydraulic circuit, and wherein said control means controls said normally open switching valve connected to one of said wheel brake cylinders not to be controlled in one hydraulic circuit of said dual hydraulic circuits, to be placed in the closed position, and controls said pressure generating means in response to the result of comparison between the desired yaw rate and the actual yaw rate of said vehicle monitored by said vehicle state monitor means, and wherein said control means controls said proportional pressure difference valve means in response to the result of comparison between the modified desired yaw rate provided by said desired yaw rate modifying means and the actual yaw rate monitored by said vehicle state monitor means, when said brake pedal is operated, with said normally open switching valve connected to said wheel brake cylinder operatively associated with said wheel to be controlled, being placed in the open position.

8. A vehicle motion control apparatus as set forth in claim 7, wherein said proportional pressure difference valve means includes a proportional solenoid valve disposed between said master cylinder and said normally open switching valves in each hydraulic circuit, said proportional solenoid valve regulating the pressure difference between the hydraulic pressure at the side of said master cylinder and the hydraulic pressure at the side of said normally open switching valves to provide the desired pressure difference, and includes a relief valve disposed in parallel with said proportional solenoid valve for allowing the brake fluid to flow from said normally open switching valves toward said master cylinder when the hydraulic pressure at the side of said normally open switching valves exceeds a predetermined upper limit pressure.

9. A vehicle motion control apparatus as set forth in claim 7, wherein said proportional pressure difference valve means includes a proportional pressure difference valve disposed between said master cylinder and said normally open switching valves in each hydraulic circuit, and wherein said control means selects one of a communication position for said proportional pressure difference valve where flow of brake fluid is allowed through said proportional pressure difference valve, and a pressure difference position for said proportional pressure difference valve where flow of the brake fluid is restricted on the basis of the pressure difference between the hydraulic pressure at the side of said master cylinder and the hydraulic pressure at the side of said normally open switching valves to provide the desired pressure difference.

10. A vehicle motion control apparatus as set forth in claim 1, wherein said one wheel brake cylinder for which the modified desired yaw rate is provided by said desired yaw rate modifying means, corresponds to the other wheel brake cylinder included in said hydraulic circuit including said wheel brake cylinder operatively associated with said wheel to be controlled, and wherein said desired yaw rate modifying means modifies the desired yaw rate at least in response to operation of said brake pedal, to provide a reference yaw rate for the other wheel brake cylinder, and wherein said control means controls said pressure regulating means in response to the a result of comparison between the reference yaw rate provided by said desired yaw rate modifying means and the actual yaw rate monitored by said vehicle state monitor means, and said control means controlling said pressure regulating means to regulate the hydraulic braking pressure in the other wheel brake cylinder included in said hydraulic circuit including said wheel brake cylinder operatively associated with said wheel to be controlled when said brake pedal is operated to discharge the hydraulic braking pressure from said master cylinder while said pressure regulating means is being controlled in response to the result of the comparison between the desired yaw rate and the actual yaw rate.

11. A vehicle motion control apparatus as set forth in claim 10, wherein said desired yaw rate modifying means modifies the reference yaw rate to provide a modified reference yaw rate, which is lower than the reference yaw rate, for the other wheel brake cylinder, in the case where an anti-skid control is performed by said control means for at least one of said wheel brake cylinders except said wheel brake cylinder operatively associated with said wheel to be controlled.

12. A vehicle motion control apparatus as set forth in claim 10, wherein said hydraulic pressure regulating means in each of said hydraulic circuits comprises;

normally open switching valves each disposed between said master cylinder and each of said pair of wheel brake cylinders, each of said normally open switching valves supplying the hydraulic braking pressure discharged from said master cylinder into each of said pair of wheel brake cylinders when each of said normally open switching valves is placed in an open position thereof, normally closed switching valves each connected to a passage between each of said normally open switching valves and each of said pair of wheel brake cylinders, each of said normally closed switching valves reducing the hydraulic braking pressure in each of said pair of wheel brake cylinders when each of said normally closed switching valves is placed in an open position thereof, proportional pressure difference valve means disposed between said master cylinder and said normally open switching valves in each hydraulic circuit, said proportional pressure difference valve means regulating a pressure difference between the hydraulic pressure at the side of said master cylinder and the hydraulic pressure at the side of said normally open switching valves to provide a desired pressure difference, and automatic hydraulic pressure generating means for generating a hydraulic braking pressure independently of said master cylinder and irrespective of operation of said brake pedal, and supplying the hydraulic braking pressure into a passage between said proportional pressure difference valve means and said normally open switching valves in each hydraulic circuit, and wherein said control means controls said normally open switching valve connected to the other wheel brake cylinder included in said hydraulic circuit including said wheel brake cylinder operatively associated with said wheel to be controlled, to be placed in the closed position, and controls said pressure generating means and said proportional pressure difference valve means in said hydraulic circuit including said wheel brake cylinder operatively associated with said wheel to be controlled, in response to the result of comparison between the desired yaw rate and the actual yaw rate of said vehicle monitored by said vehicle state monitor means, and wherein said control means controls said normally open switching valve and said normally closed switching valve connected to the other wheel brake cylinder, when said brake pedal is operated, in response to the result of comparison between the modified desired yaw rate provided by said desired yaw rate modifying means and the actual yaw rate monitored by said vehicle state monitor means.

13. A vehicle motion control apparatus as set forth in claim 12, wherein said proportional pressure difference valve means includes a proportional solenoid valve disposed between said master cylinder and said normally open switching valves in each hydraulic circuit, said proportional solenoid valve regulating the pressure difference between the hydraulic pressure at the side of said master cylinder and the hydraulic pressure at the side of said normally open switching valves to provide the desired pressure difference, and includes a relief valve disposed in parallel with said proportional solenoid valve for allowing the brake fluid to flow from said normally open switching valves toward said master cylinder when the hydraulic pressure at the side of said normally open switching valves exceeds a predetermined upper limit pressure.

14. A vehicle motion control apparatus as set forth in claim 12, wherein said proportional pressure difference valve means includes a proportional pressure difference valve disposed between said master cylinder and said normally open switching valves in each hydraulic circuit, and wherein said control means selects one of a communication position for said proportional pressure difference valve where flow of brake fluid is allowed through said proportional pressure difference valve, and a pressure difference position for said proportional pressure difference valve where flow of the brake fluid is restricted on the basis of the pressure difference between the hydraulic pressure at the side of said master cylinder and the hydraulic pressure at the side of said normally open switching valves to provide the desired pressure difference.

15. A vehicle motion control apparatus as set forth in claim 12, further comprising a reservoir for storing brake fluid drained from said pair of wheel brake cylinders, wherein said automatic hydraulic pressure generating means includes a hydraulic pressure pump for receiving therein the brake fluid from at least one of said reservoir and said master cylinder, and pressurizing the brake fluid in response to output from said control means, to discharge the hydraulic braking pressure.

16. A vehicle motion control apparatus comprising:
wheel brake cylinders operatively associated with wheels of a vehicle, respectively;
a master cylinder connected to said wheel brake cylinders through a dual hydraulic circuit with a pair of wheel brake cylinders included in each hydraulic circuit, said master cylinder discharging a hydraulic braking pressure into each hydraulic circuit in response to operation of a brake pedal;
hydraulic pressure regulating means disposed between said master cylinder and said pair of wheel brake cylinders, for regulating the hydraulic braking pressure supplied into each of said pair of wheel brake cylinders;
vehicle state monitor means for monitoring state variable of said vehicle;
desired value setting means for setting a desired value provided for a wheel brake cylinder operatively associated with a wheel to be controlled, out of said pair of wheel brake cylinders included in each hydraulic circuit;
desired value modifying means for modifying the desired value set by said desired value setting means to provide a modified desired value for at least one wheel brake cylinder out of said pair of wheel brake cylinders including said wheel brake cylinder operatively associated with said wheel to be controlled, at least in response to operation of said brake pedal; and
control means for controlling said pressure regulating means in response to a result of comparison between the desired value set by said desired value setting means and the state variable monitored by said vehicle state monitor means, to regulate the hydraulic braking pressure in said wheel brake cylinder operatively associated with said wheel to be controlled, said control means controlling said pressure regulating means in response to a result of comparison between the modified desired value provided by said desired value modifying means and the state variable monitored by said vehicle state monitor means, and said control means controlling said pressure regulating means to reaulate the hydraulic braking pressure in said at least one wheel brake cylinder included in said hydraulic circuit including said wheel brake cylinder operatively associated with said wheel to be controlled when said brake pedal is operated to discharge the hydraulic braking pressure from said master cylinder while said pressure regulating means is being controlled in response to the result of the comparison between the desired value and the state variable;
wherein said one wheel brake cylinder for which the modified desired value is provided by said desired value modifying means, corresponds to the other wheel brake cylinder included in said hydraulic circuit including said wheel brake cylinder operatively associated with said wheel to be controlled, and
wherein said desired value modifying means modifies the desired value at least in response to operation of said brake pedal, to provide a reference value for the other wheel brake cylinder, and
wherein said control means controls said pressure regulating means to regulate the hydraulic braking pressure in the other wheel brake cylinder included in said hydraulic circuit including said wheel brake cylinder operatively associated with said wheel to be controlled when said brake pedal is operated to discharge the hydraulic braking pressure from said master cylinder while said pressure regulating means is being controlled in response to the result of the comparison between the desired value and the state variable;
wherein said vehicle state monitor means includes yaw rate detection means for detecting an actual yaw rate of said vehicle, and
wherein said control means comprises;
desired yaw rate setting means for setting a desired yaw rate served as said desired value,
first yaw rate deviation calculation means for calculating a deviation between the desired yaw rate set by said desired yaw rate setting means and the actual yaw rate detected by said yaw rate detection means,
desired yaw rate modifying means for modifying the desired yaw rate set by said desired yaw rate setting means at least in response to operation of said brake pedal, to provide a reference yaw rate served as the reference value, and second yaw rate deviation calculation means for calculating a deviation between the reference yaw rate provided by said desired yaw rate modifying means and the actual yaw rate detected by said yaw rate detection means, and wherein said control means controls said pressure regulating means on the basis of results calculated by said first yaw rate deviation calculation means and said second yaw rate deviation calculation means, to regulate the hydraulic braking pressure in said pair of wheel brake cylinders.

17. A vehicle motion control apparatus as set forth in claim 16, wherein said desired yaw rate modifying means modifies the desired yaw rate by subtracting therefrom a predetermined value to provide the modified desired yaw rate.

* * * * *